(12) United States Patent
Destro et al.

(10) Patent No.: US 7,037,962 B2
(45) Date of Patent: May 2, 2006

(54) COMPOSITION AND PROCESS FOR ENHANCING BIO-MASS PRODUCTION IN GREENHOUSES

(75) Inventors: Mara Destro, Bologna (IT); Michela Bonora, Bologna (IT); Galileo Magnani, Pescia (IT)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 303 days.

(21) Appl. No.: 10/690,120

(22) Filed: Oct. 20, 2003

(65) Prior Publication Data
US 2004/0087446 A1 May 6, 2004

(30) Foreign Application Priority Data
Oct. 22, 2002 (EP) ................. 02405904

(51) Int. Cl.
*C08K 5/34* (2006.01)
*C08K 5/3492* (2006.01)
*A01G 9/00* (2006.01)

(52) U.S. Cl. ............... 524/89; 524/91; 524/99; 524/100; 524/102; 524/103; 524/227; 524/228; 524/229; 524/359; 47/17

(58) Field of Classification Search .......... 524/89, 524/91, 99, 100, 102, 103, 227, 228, 229, 524/359; 544/234, 242; 47/17
See application file for complete search history.

(56) References Cited

U.S. PATENT DOCUMENTS

| 2,803,640 A | 8/1957 | Heckert .............. 260/465 |
| 3,331,687 A | 7/1967 | Kosche .............. 96/1.5 |
| 4,229,454 A * | 10/1980 | Beriger .............. 514/270 |
| 4,707,297 A | 11/1987 | Paske, Jr. et al. ....... 252/301.16 |

FOREIGN PATENT DOCUMENTS

| GB | 2367824 | 4/2002 |
| JP | 2000136270 | 5/2000 |

OTHER PUBLICATIONS

Y. Antignus et al., "The Use of UV-Absorbing Plastic Sheets to Protect Crops Against Insects and Spread Of Virus Diseases", CIPA Congress Mar. 1997, pp. 23-33.
R. K. Khajuria et al., Indian Journal of Chemistry, vol. 32B, Sep. 1993, pp. 981-983.

* cited by examiner

Primary Examiner—Kriellion A. Sanders
(74) Attorney, Agent, or Firm—Tyler A. Stevenson

(57) ABSTRACT

The instant invention relates to a thermoplastic polymer composition useful in greenhouse films to enhance plant growth or in general bio-mass production. Further aspects of the invention are a process for enhancing plant growth in greenhouses by incorporating a photoactive additive together with light stabilizers into the greenhouse film and the use of the condensation product of dialkylamino benzaldehyde and barbituric acid together with light stabilizers as a plant growth enhancing additive in polymeric greenhouse films.

14 Claims, No Drawings

COMPOSITION AND PROCESS FOR ENHANCING BIO-MASS PRODUCTION IN GREENHOUSES

The instant invention relates to a thermoplastic polymer composition useful in greenhouse films to enhance plant growth or in general bio-mass production. Further aspects of the invention are a process for enhancing plant growth in greenhouses by incorporating a photoactive additive together with light stabilizers into the greenhouse film and the use of the condensation product of dialkylamino benzaldehyde and barbituric acid together with light stabilizers as a plant growth enhancing additive in polymeric greenhouse films.

It is well known in the art that some types of crops are degraded by the UV-components of solar radiation, which must be filtered off to obtain high quality and productivity of the crops. Additionally, some microorganisms, e.g. *Botrytis Cinerea*, as well as some harmful insects, e.g. white flies, aphides, thrips or leafminers, can proliferate under specific UV-irradiation. These pests can be significantly reduced when UV light does not or to less extent reach the plants. [R. Reuveni et al., *Development of photoselective PE films for control of foliar pathogens in greenhouse-grown crops, Plasticulture* No. 102, p. 7 (1994); Y. Antignus et al., *The use of UV absorbing plastic sheets to protect crops against insects and spread of virus diseases, CIPA Congress* March 1997, pp. 23–33]. On the other hand, bee activity, requiring a certain band of UV radiation, needs to be retained in greenhouses in order to ensure fructification on flowering plants, e.g. tomato, cucumber, pumpkin etc.

Plant growth is regulated by photosynthesis, photomorphogenesis and the photoperiodicity. All these processes require light and contribute in a unique way to the plant development. If the spectrum of the outside solar radiation can be significantly modified by the optical properties of the agricultural film covering a greenhouse, a change in plant growth may occur. Changes in the radiation transmitted by the agricultural film induce photo-synthetic and photo-morphogenic effects and can result in modifications of the architecture and shape of the plants with significant consequence on the value of the crop.

The condensation product of dialkylamino benzaldehyde and barbituric acid enhances plant growth in greenhouses, when incorporated into the thermoplastic polymer film covering the greenhouse. A part of the near UV light is filtered out by this condensation product and transformed into fluorescent light of substantially longer wavelength, which is believed to be responsible for the faster growth of many plants.

This condensation product alone is photochemical not sufficiently stable to ensure the desired effect for a certain time. It has now been surprisingly found that the combined use of the condensation product with a UV-absorber or/and with a sterically hindered amine significantly prolongs the lifetime of the polymer film. The fluorescence of the condensation product remains high and the plant growth effect is retained over a long time. Although the UV-absorber filters off UV light from the fluorescing condensation product, the fluorescence yield of the latter remains high enough to ensure the desired plant growth effect. The condensation product itself is colored absorbing mainly in the near UV range, whereas the Stokes shift of the fluorescence light is large, emitting light of reddish color. This fluorescence increases the light transmitted in the red region of the visible light spectrum (maximum emission approximately at 635 nm) with significant effects on crop's yield and quality, such as stem's length, thickness and growing cycle.

The product is very good compatible with a variety of polymers and with other frequently used additives.

One aspect of the invention is a polymer composition for agricultural applications in the form of films for greenhouses and small tunnel covers, films or filaments for shading nets and screens, mulch films, non-wovens or molded articles for the protection of young plants comprising a) a thermoplastic polymer;
b) the condensation product of

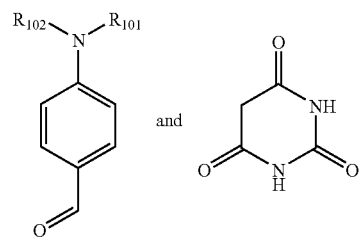

wherein $R_{101}$ and $R_{102}$ are independently hydrogen or $C_1$–$C_{18}$ alkyl;

c1) a UV-absorber; or c2) a sterically hindered amine, containing at least one radical of the formula

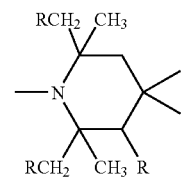

in which R is hydrogen or methyl; or c3) a UV-absorber and a sterically hindered amine, containing at least one radical of the formula

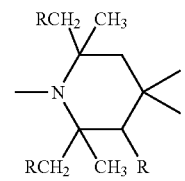

in which R is hydrogen or methyl.

Preferably the UV-absorber is selected from the group consisting of benzotriazole UV-absorbers, benzophenone UV-absorbers, hydroxyphenyl-triazine UV-absorbers and oxalic anilide UV-absorbers or mixtures thereof.

In a specific embodiment of the invention the hydroxybenzophenone is of formula I

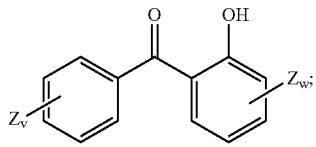
(I)

the 2-hydroxyphenylbenzotriazole is of formula IIa, IIb or IIc

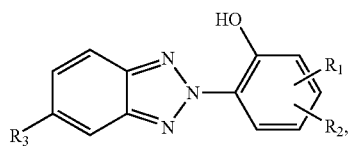
(IIa)

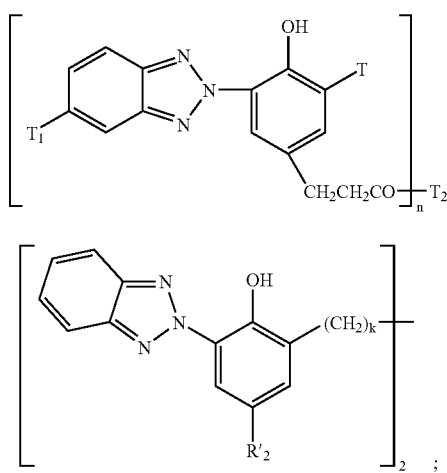
(IIb)

(IIc)

the 2-hydroxyphenyltriazine is of formula III

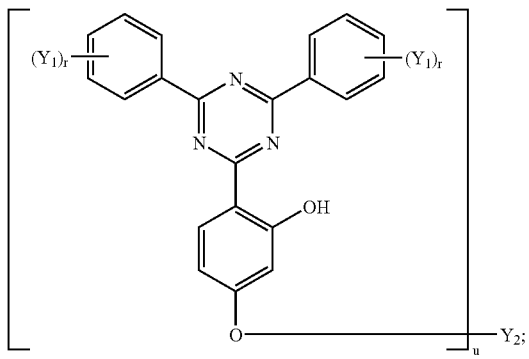
(III)

and the oxanilide is of formula (IV)

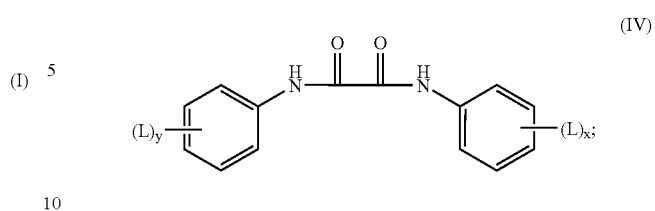
(IV)

wherein in the compounds of the formula (I) v is an integer from 1 to 3 and w is 1 or 2 and the substituents Z independently of one another are hydrogen, halogen, hydroxyl or alkoxy having 1 to 12 carbon atoms;

in the compounds of the formula (IIa), $R_1$ is hydrogen, alkyl having 1 to 24 carbon atoms, phenylalkyl having 1 to 4 carbon atoms in the alkyl moiety, cycloalkyl having 5 to 8 carbon atoms or a radical of the formula

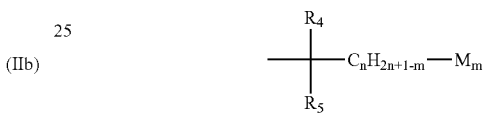

in which $R_4$ and $R_5$ independently of one another are alkyl having in each case 1 to 5 carbon atoms, or $R_4$, together with the radical $C_nH_{2n+1-m}$, forms a cycloalkyl radical having 5 to 12 carbon atoms, m is 1 or 2, n is an integer from 2 to 20 and M is a radical of the formula —$COOR_6$ in which $R_6$ is hydrogen, alkyl having 1 to 12 carbon atoms, alkoxyalkyl having in each case 1 to 20 carbon atoms in the alkyl moiety and in the alkoxy moiety or phenylalkyl having 1 to 4 carbon atoms in the alkyl moiety, $R_2$ is hydrogen, halogen, alkyl having 1 to 18 carbon atoms, and phenylalkyl having 1 to 4 carbon atoms in the alkyl moiety, and $R_3$ is hydrogen, chlorine, alkyl or alkoxy having in each case 1 to 4 carbon atoms or —$COOR_6$ in which $R_6$ is as defined above, at least one of the radicals $R_1$ and $R_2$ being other than hydrogen;

in the compounds of the formula (IIb)

T is hydrogen or alkyl having 1 to 6 carbon atoms, $T_1$ is hydrogen, chlorine or alkyl or alkoxy having in each case 1 to 4 carbon atoms, n is 1 or 2 and, if n is 1, $T_2$ is chlorine or a radical of the formula —$OT_3$ or

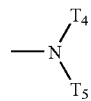

and,
if n is 2, $T_2$ is a radical of the formula

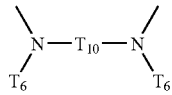

or —O—$T_9$—O—;

in which $T_3$ is hydrogen, alkyl which has 1 to 18 carbon atoms and is unsubstituted or substituted by 1 to 3 hydroxyl groups or by —OCOT$_6$, alkyl which has 3 to 18 carbon atoms, is interrupted once or several times by —O— or —NT$_6$- and is unsubstituted or substituted by hydroxyl or —OCOT$_6$, cycloalkyl which has 5 to 12 carbon atoms and is unsubstituted or substituted by hydroxyl and/or alkyl having 1 to 4 carbon atoms, alkenyl which has 2 to 18 carbon atoms and is unsubstituted or substituted by hydroxyl, phenylalkyl having 1 to 4 carbon atoms in the alkyl moiety, or a radical of the formula —CH$_2$CH(OH)-T$_7$ or

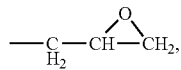

$T_4$ and $T_5$ independently of one another are hydrogen, alkyl having 1 to 18 carbon atoms, alkyl which has 3 to 18 carbon atoms and is interrupted once or several times by —O— or -NT$_6$-, cycloalkyl having 5 to 12 carbon atoms, phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms, $T_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms, phenylalkyl having 1 to 4 carbon atoms in the alkyl moiety, $T_7$ is hydrogen, alkyl having 1 to 18 carbon atoms, phenyl which is unsubstituted or substituted by hydroxyl, phenylalkyl having 1 to 4 carbon atoms in the alkyl moiety, or —CH$_2$OT$_8$, $T_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl moiety, $T_9$ is alkylene having 2 to 8 carbon atoms, alkenylene having 4 to 8 carbon atoms, alkynylene having 4 carbon atoms, cyclohexylene, alkylene which has 2 to 8 carbon atoms and is interrupted once or several times by —O—, or a radical of the formula —CH$_2$CH(OH)CH$_2$OT$_{11}$OCH$_2$CH(OH)CH$_2$— or —CH$_2$—C(CH$_2$OH)$_2$—CH$_2$—, $T_{10}$ is alkylene which has 2 to 20 carbon atoms and can be interrupted once or several times by —O—, or cyclohexylene, $T_{11}$ is alkylene having 2 to 8 carbon atoms, alkylene which has 2 to 18 carbon atoms and is interrupted once or several times by —O—, 1,3-cyclohexylene, 1,4-cyclohexylene, 1,3-phenylene or 1,4-phenylene, or $T_{10}$ and $T_6$, together with the two nitrogen atoms, are a piperazine ring;

in the compounds of formula (IIc)
$R'_2$ is $C_1$–$C_{12}$alkyl and k is a number from 1 to 4;

in the compounds of the formula (III)
u is 1 or 2 and r is an integer from 1 to 3, the substituents
$Y_1$ independently of one another are hydrogen, hydroxyl, phenyl, or halogen, halogenomethyl, alkyl having 1 to 12 carbon atoms, alkoxy having 1 to 18 carbon atoms, alkoxy having 1 to 18 carbon atoms which is substituted by a group —COO($C_1$–$C_{18}$alkyl);

if u is 1,
$Y_2$ is alkyl having 1 to 18 carbon atoms, phenyl which is unsubstituted or substituted by hydroxyl, halogen, alkyl or alkoxy having 1 to 18 carbon atoms;
alkyl which has 1 to 12 carbon atoms and is substituted by —COOH, —COOY$_8$, —CONH$_2$, —CONHY$_9$, —CONY$_9$Y$_{10}$, —NH$_2$, —NHY$_9$, —NY$_9$Y$_{10}$, —NH-COY$_{11}$, —CN and/or —OCOY$_{11}$;
alkyl which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —OCOY$_{11}$, phenylalkyl which has 1 to 5 carbon atoms in the alkyl moiety and is unsubstituted or substituted by hydroxyl, chlorine and/or methyl, —COY$_{12}$ or —SO$_2$Y$_{13}$, or, if u is 2,
$Y_2$ is alkylene having 2 to 16 carbon atoms, alkenylene having 4 to 12 carbon atoms, xylylene, alkylene which has 3 to 20 carbon atoms, is interrupted by one or more —O— atoms and/or is substituted by hydroxyl, —CH$_2$CH(OH)CH$_2$—O—Y$_{15}$—OCH$_2$CH(OH)CH$_2$, —CO—Y$_{16}$—CO—, —CO—NH—Y$_{17}$—NH—CO— or —(CH$_2$)$_m$—CO$_2$—Y$_{18}$—OCO—(CH$_2$)$_m$, in which m is 1, 2 or 3, $Y_8$ is alkyl having 1 to 18 carbon atoms, alkenyl having 3 to 18 carbon atoms, alkyl which has 3 to 20 carbon atoms, is interrupted by one or more oxygen or sulfur atoms or —NT$_6$- and/or is substituted by hydroxyl, alkyl which has 1 to 4 carbon atoms and is substituted by —P(O)(OY$_{14}$)$_2$, —NY$_9$Y$_{10}$ or —OCOY$_{11}$ and/or hydroxyl, alkenyl having 3 to 18 carbon atoms, glycidyl, or phenylalkyl having 1 to 5 carbon atoms in the alkyl moiety, $Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or $Y_9$ and $Y_{10}$ together are alkylene, oxaalkylene or azaalkylene having in each case 3 to 9 carbon atoms, $Y_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, $Y_{13}$ is alkyl having 1 to 18 carbon atoms, phenyl or alkylphenyl having 1 to 8 carbon atoms in the alkyl radical, $Y_{14}$ is alkyl having 1 to 12 carbon atoms or phenyl, $Y_{15}$ is alkylene having 2 to 10 carbon atoms, phenylene or a group -phenylene-M-phenylene-in which M is —O—, —S—, —SO$_2$—, —CH$_2$— or —C(CH$_3$)$_2$—, $Y_{16}$ is alkylene, oxaalkylene or thiaalkylene having in each case 2 to 10 carbon atoms, phenylene or alkenylene having 2 to 6 carbon atoms, $Y_{17}$ is alkylene having 2 to 10 carbon atoms, phenylene or alkylphenylene having 1 to 11 carbon atoms in the alkyl moiety, and $Y_{18}$ is alkylene having 2 to 10 carbon atoms or alkylene which has 4 to 20 carbon atoms and is interrupted once or several times by oxygen;

in the compounds of the formula (IV) x is an integer from 1 to 3 and the substituents L independently of one another are hydrogen, alkyl, alkoxy or alkylthio having in each case 1 to 22 carbon atoms, phenoxy or phenylthio.

$C_1$–$C_{18}$alkyl may be linear or branched. Examples of alkyl having up to 18 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethyl-hexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl and octadecyl.

In the compounds of the formula (IIa) $R_1$ can be hydrogen or alkyl having 1 to 24 carbon atoms, such as methyl, ethyl, propyl, butyl, hexyl, octyl, nonyl, dodecyl, tetradecyl, hexadecyl, octadecyl, nonadecyl and eicosyl and also corresponding branched isomers. Furthermore, in addition to phenylalkyl having 1 to 4 carbon atoms in the alkyl moiety, for example benzyl, $R_1$ can also be cycloalkyl having 5 to 8 carbon atoms, for example cyclopentyl, cyclohexyl and cyclooctyl, or a radical of the formula

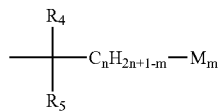

in which $R_4$ and $R_5$ independently of one another are alkyl having in each case 1 to 5 carbon atoms, in particular methyl, or $R_4$, together with the $C_nH_{2n+1-m}$ radical, forms a cycloalkyl radical having 5 to 12 carbon atoms, for example cyclohexyl, cyclooctyl and cyclodecyl. M is a radical of the formula —$COOR_6$ in which $R_6$ is not only hydrogen but also alkyl having 1 to 12 carbon atoms or alkoxyalkyl having 1 to 20 carbon atoms in each of the alkyl and alkoxy moieties. Suitable alkyl radicals $R_6$ are those enumerated for $R_1$. Examples of suitable alkoxyalkyl groups are —$C_2H_4OC_2H_5$, —$C_2H_4OC_8H_{17}$ and —$C_4H_8OC_4H_9$. As phenylalkyl having 1 to 4 carbon atoms, $R_6$ is, for example, benzyl, cumyl, α-methylbenzyl or phenylbutyl.

In addition to hydrogen and halogen, for example chlorine and bromine, $R_2$ can also be alkyl having 1 to 18 carbon atoms. Examples of such alkyl radicals are indicated in the definitions of $R_1$. $R_2$ can also be phenylalkyl having 1 to 4 carbon atoms in the alkyl moiety, for example benzyl, a-methylbenzyl and cumyl.

Halogen as a substituent means in all cases fluorine, chlorine, bromine or iodine, preferably chlorine or bromine and more preferably chlorine.

At least one of the radicals $R_1$ and $R_2$ must be other than hydrogen.

In addition to hydrogen or chlorine, $R_3$ is also alkyl or alkoxy having in each case 1 to 4 carbon atoms, for example methyl, butyl, methoxy and ethoxy, and also —$COOR_6$.

In the compounds of the formula (IIb) T is hydrogen or alkyl having 1 to 6 carbon atoms, such as methyl and butyl, $T_1$ is not only hydrogen or chlorine, but also alkyl or alkoxy having in each case 1 to 4 carbon atoms, for example methyl, methoxy and butoxy, and, if n is 1, $T_2$ is chlorine or a radical of the formula —$OT_3$ or —$NT_4T_5$. $T_3$ is here hydrogen or alkyl having 1 to 18 carbon atoms (cf. the definition of $R_1$). These alkyl radicals can be substituted by 1 to 3 hydroxyl groups or by a radical —$OCOT_6$. Furthermore, $T_3$ can be alkyl having 3 to 18 carbon atoms (cf. the definition of $R_1$) which is interrupted once or several times by —O— or —$NT_6$- and is unsubstituted or substituted by hydroxyl or —$OCOT_6$. Examples of $T_3$ as cycloalkyl are cyclopentyl, cyclohexyl or cyclooctyl. $T_3$ can also be alkenyl having 2 to 18 carbon atoms. Suitable alkenyl radicals are derived from the alkyl radicals enumerated in the definitions of $R_1$. These alkenyl radicals can be substituted by hydroxyl. Examples of $T_3$ as phenylalkyl are benzyl, phenylethyl, cumyl, α-methylbenzyl or benzyl. $T_3$ can also be a radical of the formula —$CH_2CH(OH)$—$T_7$ or

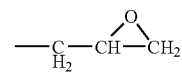

Like $T_3$, $T_4$ and $T_5$ can, independently of one another, be not only hydrogen but also alkyl having 1 to 18 carbon atoms or alkyl which has 3 to 18 carbon atoms and is interrupted once or several times by —O— or —$NT_6$-. $T_4$ and $T_5$ can also be cycloalkyl having 5 to 12 carbon atoms, for example cyclopentyl, cyclohexyl and cyclooctyl. Examples of $T_4$ and $T_5$ as alkenyl groups can be found in the illustrations of $T_3$. Examples of $T_4$ and $T_5$ as phenylalkyl having 1 to 4 carbon atoms in the alkyl moiety are benzyl or phenylbutyl. Finally, these substituents can also be hydroxyalkyl having 1 to 3 carbon atoms.

If n is 2, $T_2$ is a divalent radical of the formula

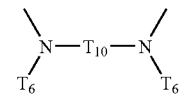

or —O—$T_9$—O—.

In addition to hydrogen, $T_6$ (see above also) is alkyl, cycloalkyl, alkenyl, aryl or phenylalkyl; examples of such radicals have already been given above.

In addition to hydrogen and the phenylalkyl radicals and long-chain alkyl radicals mentioned above, $T_7$ can be phenyl or hydroxyphenyl and also —$CH_2OT_8$ in which $T_8$ can be one of the alkyl, alkenyl, cycloalkyl, aryl or phenylalkyl radicals enumerated.

The divalent radical $T_9$ can be alkylene having 2 to 8 carbon atoms, and such radicals can also be branched. This also applies to the alkenylene and alkynylene radicals $T_9$. As well as cyclohexylene, $T_9$ can also be a radical of the formula —$CH_2CH(OH)CH_2OT_{11}OCH_2CH(OH)CH_2$— or —$CH_2$—$C(CH_2OH)_2$—$CH_2$—.

$T_{10}$ is a divalent radical and, in addition to cyclohexylene, is also alkylene which has 2 to 20 carbon atoms and which can be interrupted once or several times by —O—. Suitable alkylene radicals are derived from the alkyl radicals mentioned in the definitions of $R_1$.

$T_{11}$ is also an alkylene radical. It contains 2 to 8 carbon atoms or, if it is interrupted once or several times by —O—, 4 to 10 carbon atoms. $T_{11}$ is also 1,3-cyclohexylene, 1,4-cyclohexylene, 1,3-phenylene or 1,4-phenylene.

Together with the two nitrogen atoms, $T_6$ and $T_{10}$ can also be a piperazine ring.

Examples of alkyl, alkoxy, phenylalkyl, alkylene, alkenylene, alkoxyalkyl and cycloalkyl radicals and also alkylthio, oxaalkylene or azoalkylene radicals in the compounds of the formulae (I), (IIa), (IIb), (IIc), (III) and IV) can be deduced from the above statements.

Within the benzotriazole UV-absorbers those according to formula IIa are in general preferred.

The UV absorbers of the formulae (I), (IIa), (IIb), (IIc), (III) and (IV) are known per se and are described, together with their preparation in, for example, WO 96/28431, EP-A-323 408, EP-A-57 160, U.S. Pat. No. 5,736,597 (EP-A-434 608), U.S. Pat. No. 4,619,956, DE-A 31 35 810 and GB-A 1 336 391. Preferred meanings of substituents and individual compounds can be deduced from the documents mentioned.

In another embodiment the UV-absorbers of the class of hydroxyphenyl triazines are of formula (IIIa)

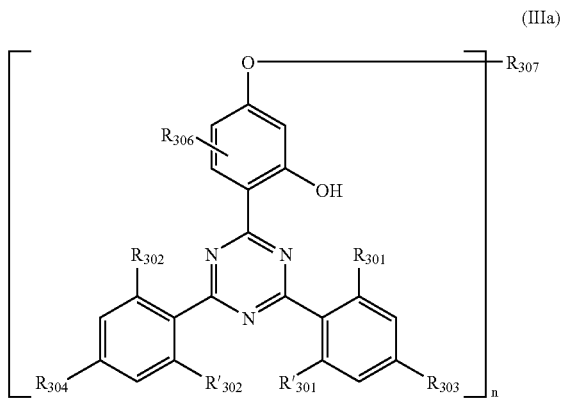

(IIIa)

in which n is 1 or 2;

$R_{301}$, $R'_{301}$, $R_{302}$ and $R'_{302}$, independently of one another, are H, OH, $C_1$–$C_{12}$alkyl; $C_2$–$C_6$alkenyl; $C_1$–$C_{12}$alkoxy; $C_2$–$C_{18}$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_{303}$ and $R_{304}$, independently of one another, are H, $C_1$–$C_{12}$alkyl; $OR'_{307}$; $C_2$–$C_6$alkenyl; $C_2$–$C_{18}$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_{306}$ is hydrogen, $C_1$–$C_{24}$alkyl, $C_5$–$C_{12}$cycloalkyl or $C_7$–$C_{15}$phenylalkyl;

$R_{307}$, in the case where n=1, and $R'_{307}$, independently of one another, are hydrogen or $C_1$–$C_{18}$alkyl; or are $C_1$–$C_{12}$alkyl which is substituted by OH, $C_1$–$C_{18}$alkoxy, allyloxy, halogen, —COOH, —COOR$_{308}$, —CONH$_2$, —CONHR$_{309}$, —CON(R$_{309}$)(R$_{310}$), —NH$_2$, —NHR$_{309}$, —N(R$_{309}$)(R$_{310}$), —NHCOR$_{311}$, —CN, —OCOR$_{311}$, phenoxy and/or phenoxy which is substituted by $C_1$–$C_{18}$alkyl, $C_1$–$C_{18}$alkoxy or halogen; or $R_{307}$ is $C_3$–$C_{50}$alkyl which is interrupted by —O— and may be substituted by OH; or $R_7$ is $C_3$–$C_6$alkenyl; glycidyl; $C_5$–$C_{12}$cycloalkyl which is substituted by OH, $C_1$–$C_4$alkyl or —OCOR$_{311}$; $C_7$–$C_{11}$phenylalkyl which is unsubstituted or substituted by OH, Cl or CH$_3$; —CO—R$_{312}$ or —SO$_2$—R$_{313}$;

$R_{307}$, in the case where n=2, is $C_2$–$C_{16}$alkylene, $C_4$–$C_{12}$alkenylene, xylylene, $C_3$–$C_{20}$alkylene which is interrupted by O and/or substituted by OH, or is a group of the formula —CH$_2$CH(OH)CH$_2$O—R$_{320}$—OCH$_2$CH(OH)CH$_2$—, —CO—R$_{321}$—CO—, —CO—NH—R$_{322}$—NH—CO— or —(CH$_2$)$_m$—COO—R$_{323}$—OOC—(CH$_2$)$_m$—, in which m is a number in the range from 1 to 3, or is

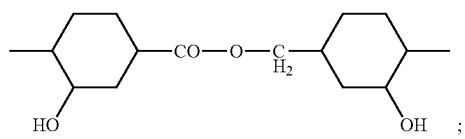

$R_{308}$ is $C_1$–$C_{18}$alkyl; $C_2$–$C_{18}$alkenyl; hydroxyethyl; $C_3$–$C_{50}$alkyl which is interrupted by O, NH, NR$_{309}$ or S and/or is substituted by OH; $C_1$–$C_4$alkyl which is substituted by —P(O)(OR$_{314}$)$_2$, —N(R$_{309}$)(R$_{310}$) or —OCOR$_{311}$ and/or OH; glycidyl; $C_5$–$C_{12}$cycloalkyl; phenyl; $C_7$–$C_{14}$alkylphenyl or $C_7$–$C_{11}$phenylalkyl;

$R_{309}$ and $R_{310}$, independently of one another, are $C_1$–$C_{12}$alkyl; $C_3$–$C_{12}$alkoxyalkyl; $C_4$–$C_{16}$dialkylaminoalkyl or $C_5$–$C_{12}$cycloalkyl, or $R_{309}$ and $R_{310}$ together are $C_3$–$C_9$alkylene or -oxaalkylene or -azaalkylene;

$R_{311}$ is $C_1$–$C_{18}$alkyl; $C_2$–$C_{18}$alkenyl or phenyl; $C_2$–$C_{12}$hydroxyalkyl; cyclohexyl; or is $C_3$–$C_{50}$alkyl which is interrupted by —O— and may be substituted by OH;

$R_{312}$ is $C_1$–$C_{18}$alkyl; $C_2$–$C_{18}$alkenyl; phenyl; $C_1$–$C_{18}$alkoxy; $C_3$–$C_{18}$alkenyloxy; $C_3$–$C_{50}$alkoxy which is interrupted by O, NH, NR$_{309}$ or S and/or substituted by OH; cyclohexyloxy; $C_7$–$C_{14}$alkylphenoxy; $C_7$–$C_{11}$phenylalkoxy; phenoxy; $C_1$–$C_{12}$alkylamino; phenylamino; tolylamino or naphthylamino;

$R_{313}$ is $C_1$–$C_{12}$alkyl; phenyl; naphthyl or $C_7$–$C_{14}$alkylphenyl;

$R_{314}$ is $C_1$–$C_{12}$alkyl, methylphenyl or phenyl;

$R_{320}$ is $C_2$–$C_{10}$alkylene; $C_4$–$C_{50}$alkylene which is interrupted by O, phenylene or a -phenylene-X-phenylene- group, in which X is —O—, —S—, —SO$_2$—, —CH$_2$— or —C(CH$_3$)$_2$—;

$R_{321}$ is $C_2$–$C_{10}$alkylene, $C_2$–$C_{10}$oxaalkylene, $C_2$–$C_{10}$thiaalkylene, $C_6$–$C_{12}$arylene or $C_2$–$C_6$alkenylene;

$R_{322}$ is $C_2$–$C_{10}$alkylene, phenylene, tolylene, diphenylenemethane or

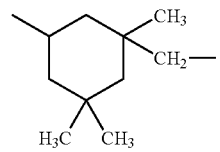

group; and $R_{323}$ is $C_2$–$C_{10}$alkylene or $C_4$–$C_{20}$alkylene which is interrupted by O.

Halogen is in all cases fluorine, chlorine, bromine or iodine.

Examples of alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethyl-hexyl, 1,1,3-trimethylhexyl, 1,1,3,3-tetramethylpentyl, nonyl, decyl, undecyl, 1-methylundecyl, dodecyl.

Examples of alkoxy having up to 12 carbon atoms are methoxy, ethoxy, propoxy, isopropoxy, butoxy, isobutoxy, pentoxy, isopentoxy, hexoxy, heptoxy, octoxy, decyloxy, dodecyloxy.

Examples of alkenoxy are propenyloxy, butenyloxy, pentenyloxy and hexenyloxy.

Examples of $C_5$–$C_{12}$cycloalkyl are cyclopentyl, cyclohexyl, cycloheptyl, cyclooctyl and cyclododecyl. $C_5$–$C_8$Cycloalkyl, especially cyclohexyl, is preferred.

$C_1$–$C_4$Alkyl-substituted $C_5$–$C_{12}$cycloalkyl is for example methylcyclohexyl or dimethylcyclohexyl.

OH— and/or $C_1$–$C_{10}$alkyl-substituted phenyl is for example methylphenyl, dimethylphenyl, trimethylphenyl, tert-butylphenyl or 3,5-di-tert-butyl-4-hydroxyphenyl.

Alkoxy-substituted phenyl is for example methoxyphenyl dimethoxyphenyl or trimethoxyphenyl.

Examples of $C_7$–$C_9$phenylalkyl are benzyl and phenylethyl.

$C_7$–$C_9$Phenylalkyl which is substituted on the phenyl radical by —OH and/or by alkyl having up to 10 carbon atoms is for example methylbenzyl, dimethylbenzyl, trimethylbenzyl, tert-butylbenzyl or 3,5-di-tert-butyl-4-hydroxybenzyl.

Examples of alkenyl are allyl, 2-methallyl, butenyl, pentenyl and hexenyl. Allyl is preferred. The carbon atom in position 1 is preferably saturated.

Examples of alkylene are methylene, ethylene, propylene, trimethylene, tetramethylene, pentamethylene, 2,2-dimethyltrimethylene, hexamethylene, trimethylhexamethylene, octamethylene and decamethylene.

Examples of alkenylene are butenylene, pentenylene and hexenylene.

$C_6$–$C_{12}$ arylene is preferably phenylene.

Alkyl interrupted by O is for example —$CH_2$—$CH_2$—O—$CH_2$—$CH_3$, —$CH_2$—$CH_2$—O—$CH_3$— or —$CH_2$—$CH_2$—O—$CH_2$—$CH_2$—$CH_2$—O—$CH_2$—$CH_3$—. It is preferably derived from polyethlene glycol. A general description is —(($CH_2$)$_a$—O)$_b$—H/$CH_3$, wherein a is a number from 1 to 6 and b is a number from 2 to 10.

$C_2$–$C_{10}$ oxaalkylene and $C_2$–$C_{10}$thiaalkylene can be deduced from the above mentioned alkylene groups by substituting one or more carbon atoms by an oxygen atom or a sulphur atom.

Specific examples of 2-hydroxybenzophenones are for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Specific examples of 2-(2'-hydroxyphenyl)benzotriazoles are for example 2-(2'-hydroxy-5'-methylphenyl)-benzotriazole, 2-(3',5'-di-tert-butyl-2'-hydroxyphenyl)benzotriazole, 2-(5'-tert-butyl- 2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—$CH_2CH_2$—COO—$CH_2CH_2$-]$_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetra-methylbutyl)-phenyl]benzotriazole; 2-[2'-hydroxy-3'-(1,1,3,3-tetramethylbutyl)-5'-(α,α-dimethylbenzyl)-phenyl]benzotriazole.

Specific examples of 2-(2-hydroxyphenyl)-1,3,5-triazines are for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3, 5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3, 5-triazine, 2-(2-hydroxy-4-methoxyphenyl)-4,6-diphenyl-1, 3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxy-propyloxy] phenyl}-4, 6-bis(2,4-dimethylphenyl)-1,3,5-triazine and 2-(2-hydroxy-4-(2-ethyl-hexyl)oxy)phenyl-4,6-di(4-phenyl)phenyl-1,3,5-triazine.

For instance the hydroxyphenyl-triazine UV-absorbers are of formulae:

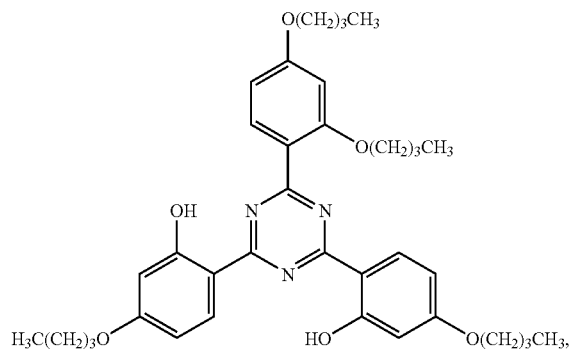
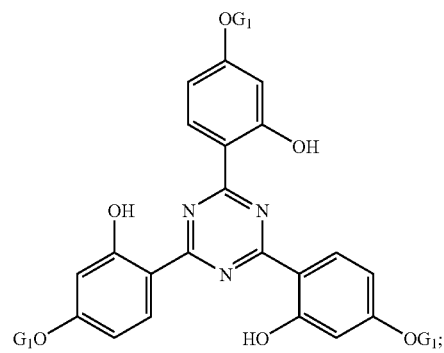
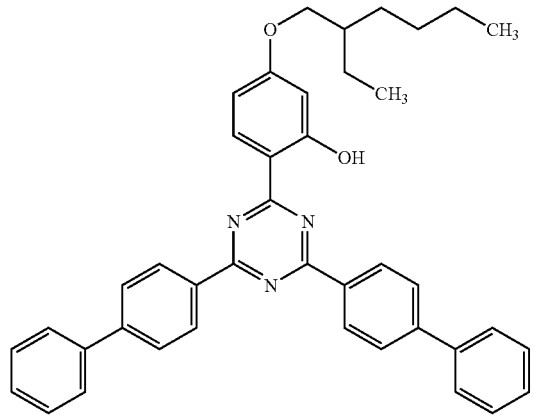
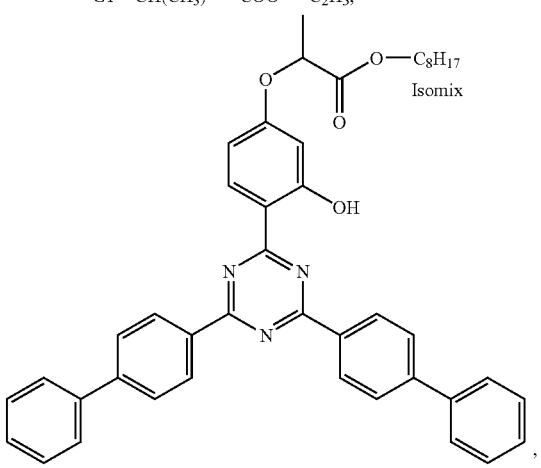
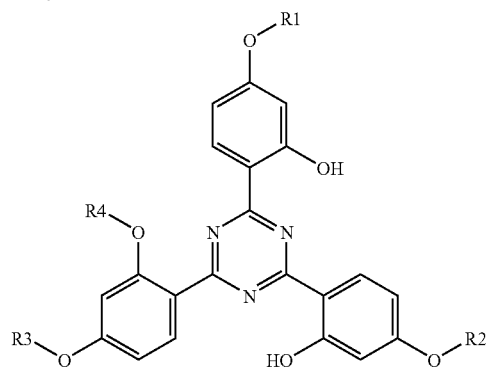
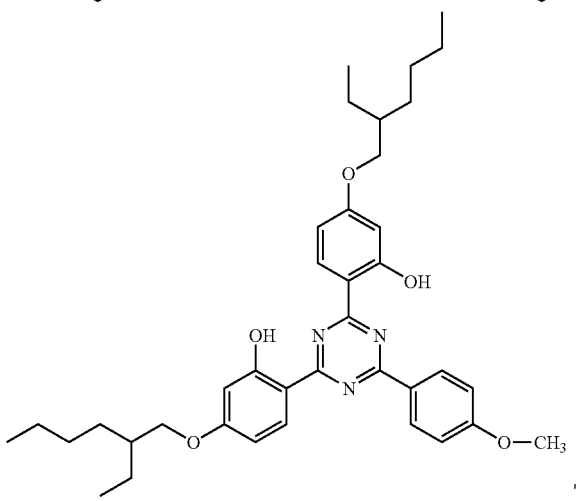
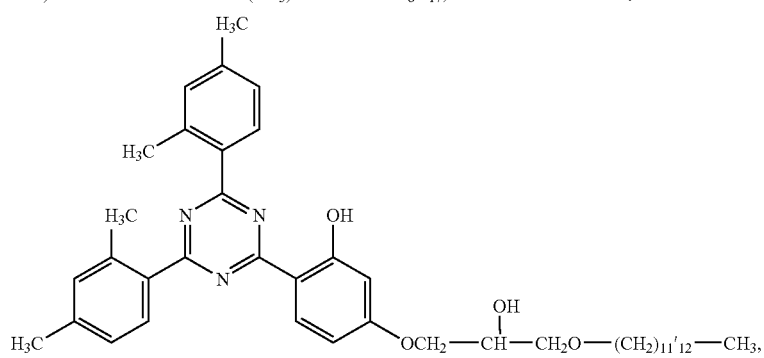

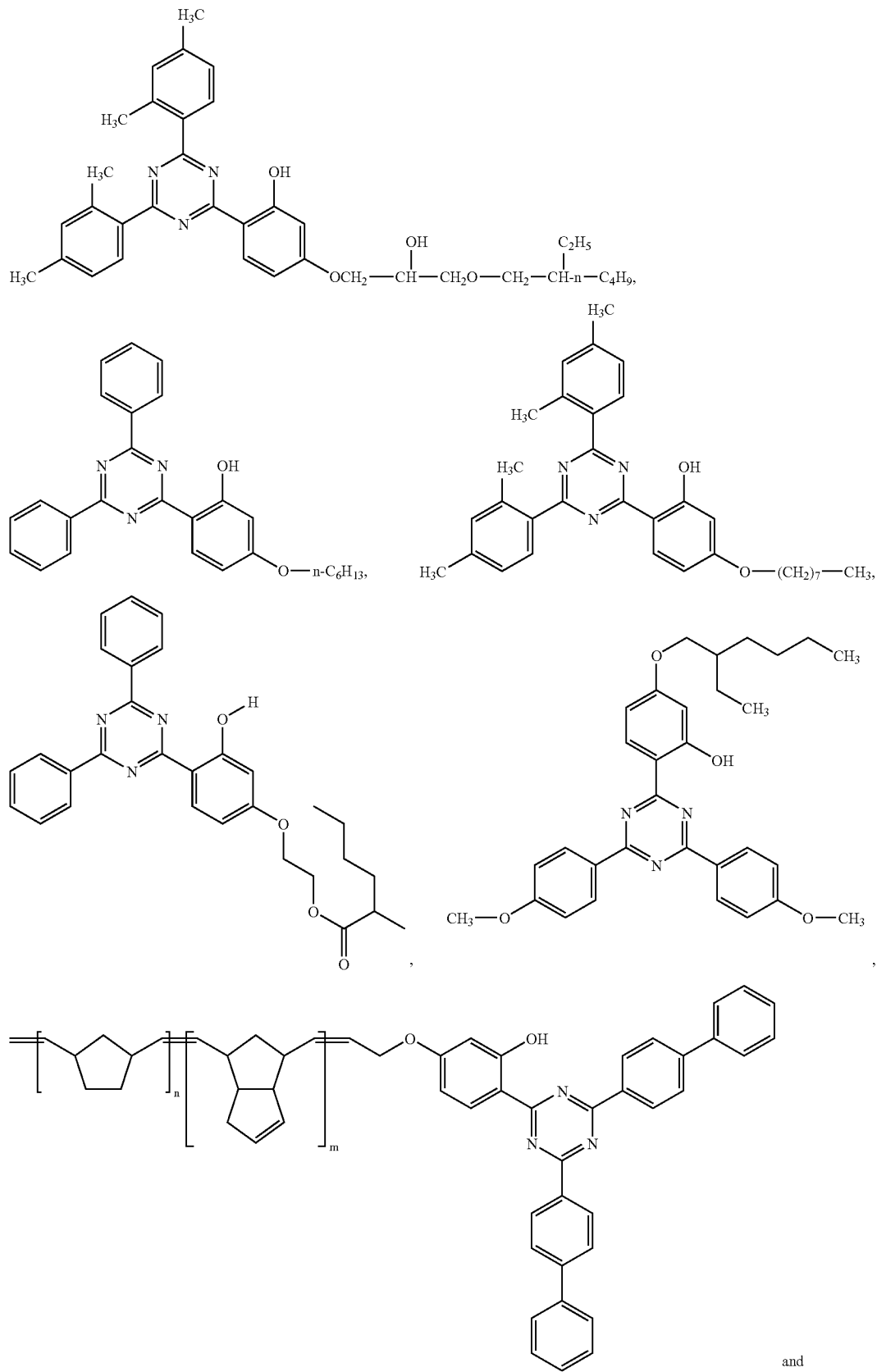

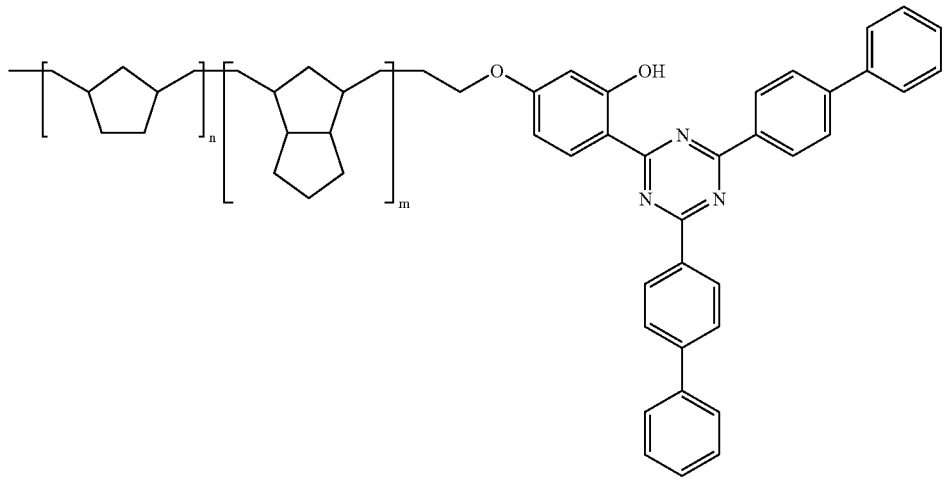

The hydroxyphenyl triazine UV-absorbers are known and partially items of commerce. They can be prepared according to the above documents.

Yet in another embodiment of the invention oligomeric or polymeric hydroxyphenyl triazines may be used, in particular those of formula (IIIc)

-[A-L-D-L]$_x$-  (IIIc)

in which
x is a number from 1 to 50;
A is a group of the formula (IIIb)

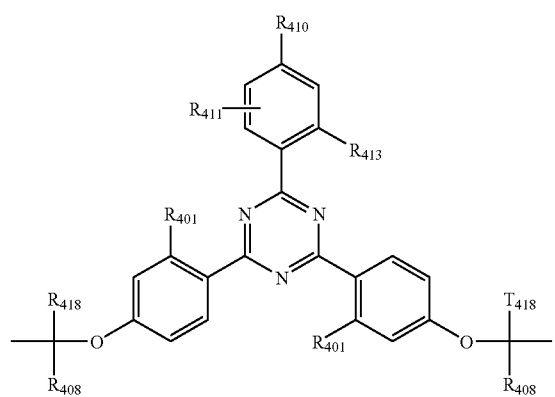

(IIIb)

or has one of the meanings given for D, wherein formula (IIIc) contains at least one A conforming to formula (IIIb);
D is a divalent residue containing 2 to 60 carbon atoms comprising an aliphatic, cycloaliphatic or aromatic hydrocarbon, or said aliphatic residue substituted by OH or interrupted by O or both substituted by OH and interrupted by O; and in case that D bonds to the carbon atom of L, D also comprises methylene or a direct bond;
L stands for an ester linkage group;
the $R_{401}$ are independently of each other H, $OR_{407}$ or OH, with the proviso that at least one of $R_{401}$ or $R_{413}$ is OH;
the $R_{407}$ are independently of each other hydrogen, $C_1$–$C_{12}$alkyl or a radical of formula (III)

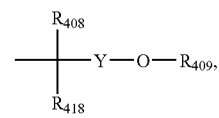

(III)

wherein in formula (I) at least one of the $R_{407}$ is a radical of formula (III);
$R_{408}$ is hydrogen, $C_1$–$C_{18}$alkyl; $C_5$–$C_{12}$cycloalkyl; $C_2$–$C_{18}$alkenyl; phenyl; $C_7$–$C_{11}$phenylalkyl; $C_7$–$C_{11}$alkylphenyl; $C_1$–$C_{18}$alkyl substituted by phenyl, OH, halogen; $C_1$–$C_{18}$alkoxy, $C_5$–$C_{12}$cycloalkoxy, $C_3$–$C_{18}$alkenyloxy or COOH;
Y is —CO— or $C_1$–$C_{12}$alkylene;
$R_{409}$, if Y is —CO—, is $C_{20}$–$C_{60}$ alkyl, $C_{20}$–$C_{60}$alkyl substituted by OH and/or interrupted by O, or

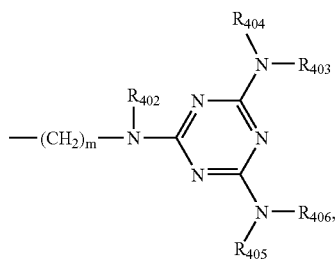

(IV)

is $C_{20}$–$C_{60}$alkenyl, or is a group of formula (IV)
wherein m is a number from 1 to 20;
$R_{409}$, if Y is alkylene, is $C_{20}$–$C_{60}$alkanoyl;
$R_{402}$, $R_{403}$, $R_{404}$, $R_{405}$ and $R_{406}$ are independently of each other hydrogen, $C_1$–$C_{38}$alkyl which is unsubstituted or substituted by hydroxy or $C_1$–$C_8$alkoxy; or $C_1$–$C_{38}$alkyl which is interrupted by an oxygen atom or a $N(C_1$–$C_{18})$alkyl group;
phenyl or $C_7$–$C_{12}$phenylalkyl which are unsubstituted or substituted by hydroxy or $C_1$–$C_8$alkyl;
$R_{410}$ is hydrogen, $C_1$–$C_4$alkyl, Cl, phenyl or a group —$OR_{407}$;

$R_{411}$ is hydrogen or methyl;
$R_{413}$ is hydrogen, methyl, OH or $OR_7$;
$R_{414}$ and $R_{415}$ are independently hydrogen, $C_1$–$C_8$alkyl, Cl or a group $OR_{407}$;
$R_{416}$ is hydrogen, $C_1$–$C_8$alkyl, Cl or phenyl;
$R_{418}$ is hydrogen or $C_1$–$C_8$alkyl.

Specific compounds are for example:

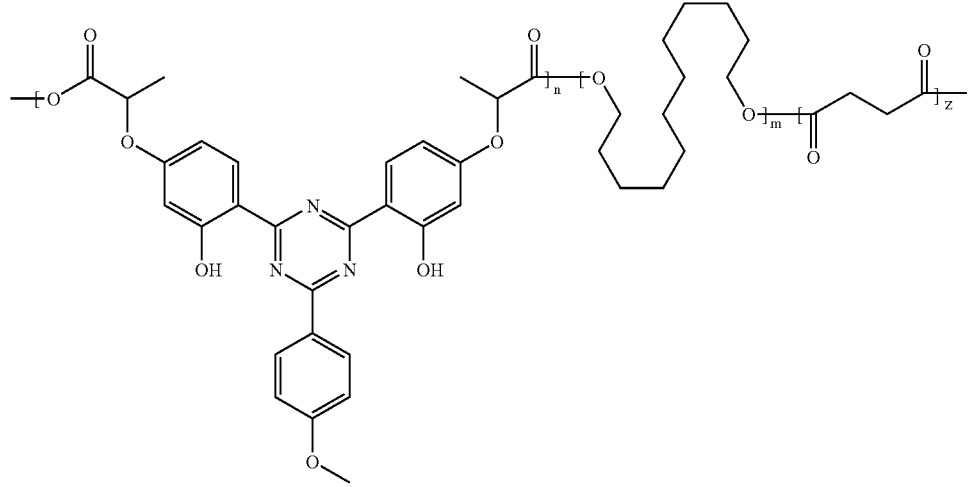

with monomer ratio n:m:z=0.5:1:0.5 and

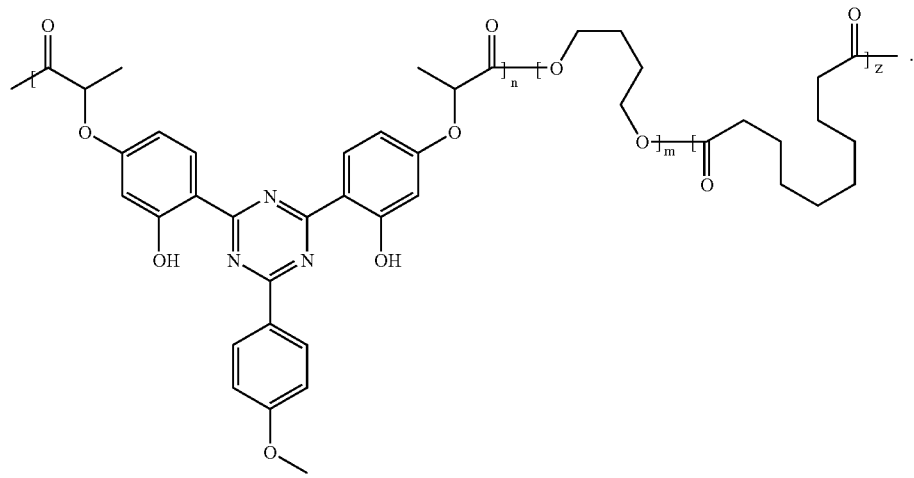

n = 0.5; m = 1; z = 0.5

The hydroxyphenyl triazine UV-absorbers are known and can be prepared according to WO 03/004557. Further oligomeric or polymeric UV-absorbers are for example disclosed in WO 01/62821.

Specific examples for oxamides are for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

The above mentioned UV-absorbers are largely items of commerce and for example known as Tinuvin® 326, 327, 328, 350, 360 or Chimassorb® 81 from Ciba Specialty Chemicals or Cyasorb® 1164 from Cytech Inc.

In many cases it may be of advantage to use a combination of UV-absorbers from different classes, such as for example a benzophenone UV-absorber with a benzotriazole UV-absorber or a hydroxyphenyltriazine UV-absorber with a benzotriazole UV-absorber. If such a combination is used, the weight ratio between both UV-absorbers is for example from 1:5 to 5:1, for instanc from 1:3 to 3:1, particularly 1:1.5 to 1.5:1.

The total amount of UV-absorber is for example from 0.005 to 5%, preferably from 0.1 to 2% and particularly from 0.2 to 1.5% based on the weight of the polymer.

For instance the weight ratio of the condensation product, component b) to the UV-absorber, component c1) is from 10:1 to 1:10, for example from 5:1 to 1:5 and in particular from 3:1 to 1:3.

The sterically hindered amine contains at least one radical of the formula

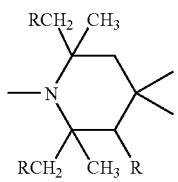

in which R is hydrogen or methyl.

The sterically hindered amine light stabilizer useful in the instant invention is preferably a compound of formulae (A-1) to (A-10) or of formulae (B-1) to (B-10);

(α-1) a compound of the formula (A-1)

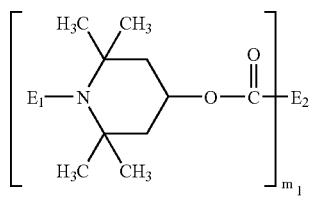

in which
$E_1$ is hydrogen, $C_1$–$C_8$alkyl, O, —OH, —$CH_2CN$, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl,
$m_1$ is 1, 2 or 4,
if $m_1$ is 1, $E_2$ is $C_1$–$C_{25}$alkyl,
if $m_1$ is 2, $E_2$ is $C_1$–$C_{14}$alkylene or a group of the formula (a-I)

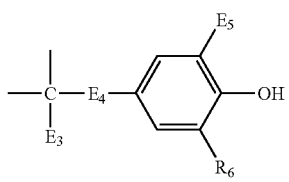

wherein $E_3$ is $C_1$–$C_{10}$alkyl or $C_2$–$C_{10}$alkenyl, $E_4$ is $C_1$–$C_{10}$alkylene, and
$E_5$ and $E_6$ independently of one another are $C_1$–$C_4$alkyl, cyclohexyl or methylcyclohexyl, and
if $m_1$ is 4, $E_2$ is $C_4$–$C_{10}$alkanetetrayl;

(α-2) a compound of the formula (A-2)

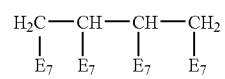

in which
two of the radicals $E_7$ are —COO—($C_1$–$C_{20}$alkyl), and
two of the radicals $E_7$ are a group of the formula (a-II)

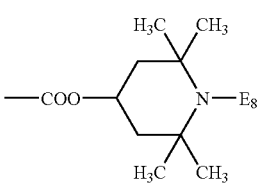

with $E_8$ having one of the meanings of $E_1$;

(α-3) a compound of the formula (A-3)

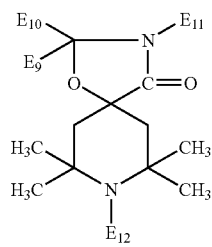

in which
$E_9$ and $E_{10}$ together form $C_2$–$C_{14}$alkylene,
$E_{11}$ is hydrogen or a group -$Z_1$-COO-$Z_2$,
$Z_1$ is $C_2$–$C_{14}$alkylene, and
$Z_2$ is $C_1$–$C_{24}$alkyl, and
$E_{12}$ has one of the meanings of $E_1$;

(α-4) a compound of the formula (A-4)

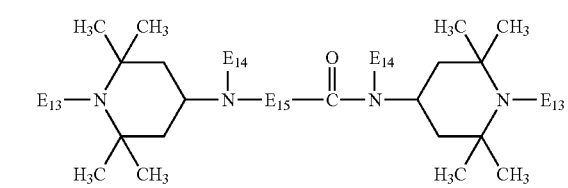

wherein
the radicals $E_{13}$ independently of one another have one of the meanings of $E_1$,
the radicals $E_{14}$ independently of one another are hydrogen or $C_1$–$C_{12}$alkyl, and
$E_{15}$ is $C_1$–$C_{10}$alkylene or $C_3$–$C_{10}$alkylidene;

(α-5) a compound of the formula (A-5)

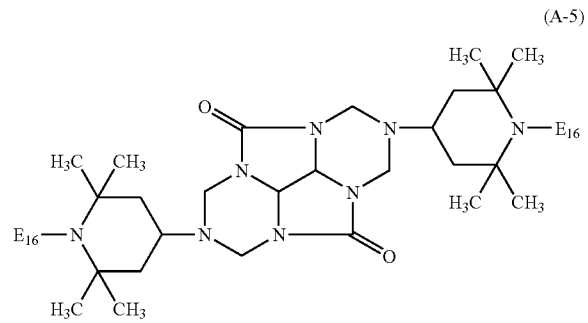

wherein
the radicals $E_{16}$ independently of one another have one of the meanings of $E_1$;

(α-6) a compound of the formula (A-6)

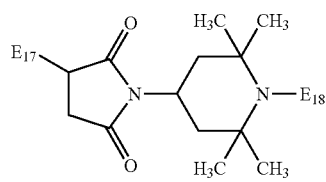

in which
$E_{17}$ is $C_1$–$C_{24}$alkyl, and
$E_{18}$ has one of the meanings of $E_1$;

(α-7) a compound of the formula (A-7)

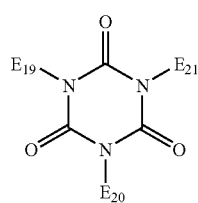

in which
$E_{19}$, $E_{20}$ and $E_{21}$ independently of one another are a group of the formula (a-III)

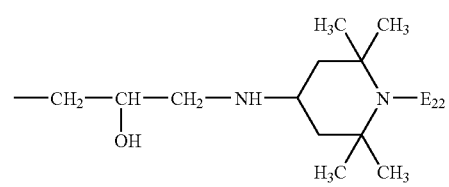

wherein $E_{22}$ has one of the meanings of $E_1$;

(α-8) a compound of the formula (A-8)

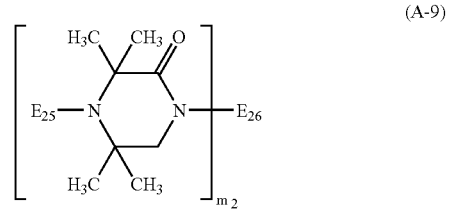

wherein
the radicals $E_{23}$ independently of one another have one of the meanings of $E_1$, and $E_{24}$ is hydrogen, $C_1$–$C_{12}$alkyl or $C_1$–$C_{12}$alkoxy;

(α-9) a compound of the formula (A-9)

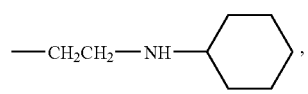

wherein
$m_2$ is 1, 2 or 3,
$E_{25}$ has one of the meanings of $E_1$, and
when $m_2$ is 1, $E_{26}$ is a group —CH$_2$CH$_2$—NH—⟨cyclohexyl⟩, when $m_2$ is 2, $E_{26}$ is $C_2$–$C_{22}$alkylene, and,
when $m_2$ is 3, $E_{26}$ is a group of the formula (a-IV)

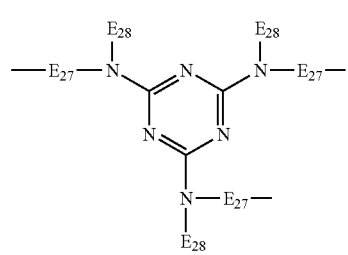

wherein the radicals $E_{27}$ independently of one another are $C_2$–$C_{12}$alkylene, and
the radicals E28 independently of one another are $C_1$–$C_{12}$alkyl or $C_5$–$C_{12}$cycloalkyl;

(α-10) a compound of the formula (A-10)

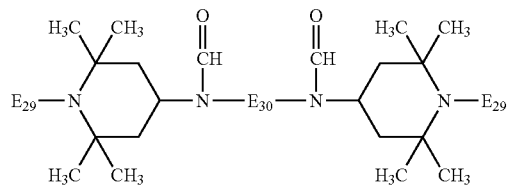

wherein
the radicals $E_{29}$ independently of one another have one of the meanings of $E_1$, and $E_{30}$ is $C_2$–$C_{22}$alkylene, $C_5$–$C_7$cycloalkylene, $C_1$–$C_4$alkylenedi($C_5$–$C_7$cycloalkylene), phenylene or phenylenedi($C_1$–$C_4$alkylene);

(β-1) a compound of the formula (B-1)

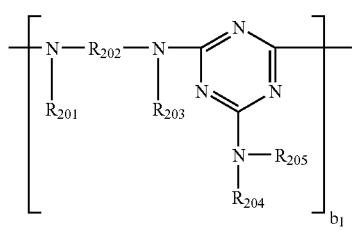

in which
$R_{201}$, $R_{203}$, $R_{204}$ and $R_{205}$ independently of one another are hydrogen, $C_1$–$C_{12}$alkyl, $C_5$–$C_{12}$cycloalkyl, $C_1$–$C_4$-alkyl-substituted $C_5$–$C_{12}$cycloalkyl, phenyl, phenyl which is substituted by —OH and/or $C_1$–$C_{10}$alkyl; $C_7$–$C_9$phenylalkyl, $C_7$–$C_9$phenylalkyl which is substituted on the phenyl radical by —OH and/or $C_1$–$C_{10}$alkyl; or a group of the formula (b-I)

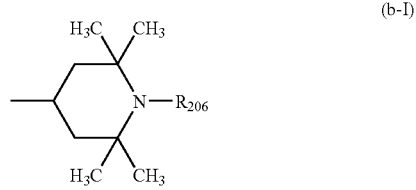

$R_{202}$ is $C_2$–$C_{18}$alkylene, $C_5$–$C_7$cycloalkylene or $C_1$–$C_4$alkylenedi($B_5$–$C_7$cycloalkylene), or
the radicals $R_{201}$, $R_{202}$ and $R_{203}$, together with the nitrogen atoms to which they are bonded, perform a 5- to 10-membered heterocyclic ring, or
$R_{204}$ and $R_{205}$, together with the nitrogen atom to which they are bonded, form a 5- to 10-membered heterocyclic ring,
$R_{206}$ is hydrogen, $C_1$–$C_8$alkyl, O, —OH, —$CH_2CN$, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl, and
$b_1$ is a number from 2 to 50,
with the proviso that at least one of the radicals $R_{201}$, $R_{203}$, $R_{204}$ and $R_{205}$ is a group of the formula (b-I);

(β-2) a compound of the formula (B-2)

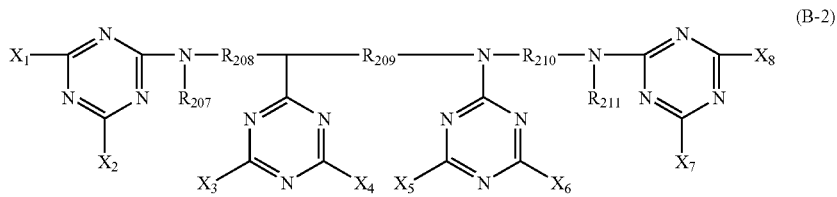

wherein
$R_{207}$ and $R_{211}$ independently of one another are hydrogen or $C_1$–$C_{12}$alkyl,
$R_{208}$, $R_{209}$ and $R_{210}$ independently of one another are $C_2$–$C_{10}$alkylene, and
$X_1$, $X_2$, $X_3$, $X_4$, $X_5$, $X_6$, $X_7$ and $X_8$ independently of one another are a group of the formula (b-II),

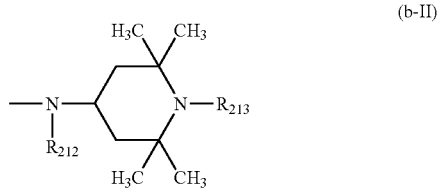

in which $R_{212}$ is hydrogen, $C_1$–$C_{12}$alkyl, $C_5$–$C_{12}$cycloalkyl, $C_1$–$C_4$alkyl-substituted $C_5$–$C_{12}$cycloalkyl, phenyl, —OH— and/or $C_1$–$C_{10}$alkyl-substituted phenyl, $C_7$–$C_9$phenylalkyl,
$C_7$–$C_9$phenylalkyl which is substituted on the phenyl radical by —OH and/or $C_1$–$C_{10}$alkyl; or a group of the formula (b-I) as defined above, and
$R_{213}$ has one of the meanings of $R_{206}$;

(β-3) a compound of the formula (B-3)

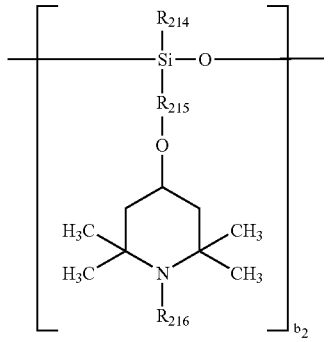

in which
$R_{214}$ is $C_1$–$C_{10}$alkyl, $C_5$–$C_{12}$cycloalkyl, $C_1$–$C_4$alkyl-substituted $C_5$–$C_{12}$cycloalkyl, phenyl or $C_1$–$C_{10}$alkyl-substituted phenyl,
$R_{215}$ is $C_3$–$C_{10}$alkylene,
$R_{216}$ has one of the meanings of $R_{206}$, and
$b_2$ is a number from 2 to 50;

(β-4) a compound of the formula (B-4)

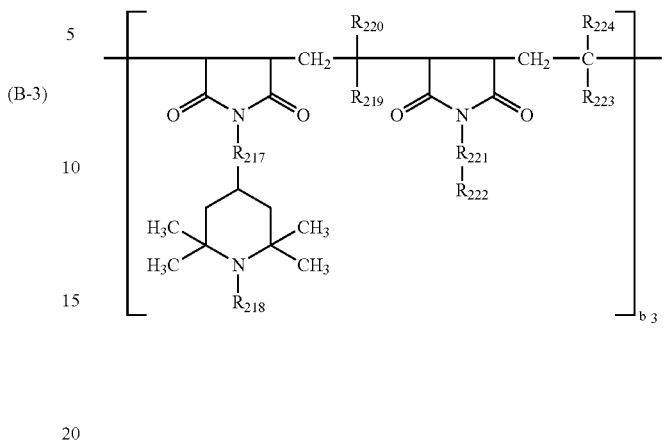

in which
$R_{217}$ and $R_{221}$ independently of one another are a direct bond or a —N($X_9$)—CO—$X_{10}$—CO—N($X_{11}$)— group, where $X_9$ and $X_{11}$ independently of one another are hydrogen, $C_1$–$C_8$alkyl, $C_5$–$C_{12}$cycloalkyl, phenyl, $C_7$–$C_9$phenylalkyl or a group of the formula (b-I),
$X_{10}$ is a direct bond or $C_1$–$C_4$alkylene,
$R_{218}$ has one of the meanings of $R_{206}$,
$R_{219}$, $R_{220}$, $R_{223}$ and $R_{224}$ independently of one another are hydrogen, $C_1$–$C_{30}$alkyl, $C_5$–$C_{12}$cycloalkyl or phenyl,
$R_{222}$ is hydrogen, $C_1$–$C_{30}$alkyl, $C_5$–$C_{12}$cycloalkyl, phenyl, $C_7$–$C_9$phenylalkyl or a group of the formula (b-I), and
$b_3$ is a number from 1 to 50;

(β-5) a compound of the formula (B-5)

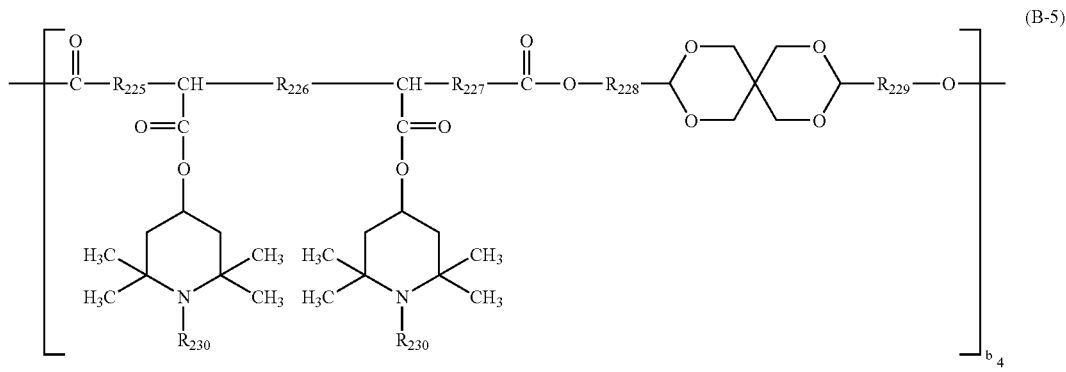

in which $R_{225}$, $R_{226}$, $R_{227}$, $R_{228}$ and $R_{229}$ independently of one another are a direct bond or $C_1$–$C_{10}$alkylene, $R_{230}$ has one of the meanings of $R_{206}$, and $b_4$ is a number from 1 to 50;

(β-6) a product (B-6) obtainable by reacting a product, obtained by reaction of a polyamine of the formula (B-6-1) with cyanuric chloride, with a compound of the formula (B-6-2)

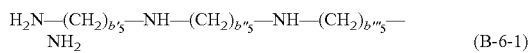
(B-6-1)

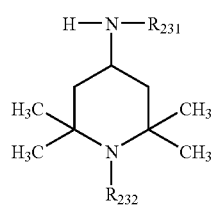
(B-6-2)

in which $b'_5$, $b''_5$ and $b'''_5$ independently of one another are a number from 2 to 12, $R_{231}$ is hydrogen, $C_1$–$C_{12}$alkyl, $C_5$–$C_{12}$cycloalkyl, phenyl or $C_7$–$C_9$phenylalkyl, and $R_{232}$ has one of the meanings of $R_{206}$;

(β-7) a compound of the formula (B-7)

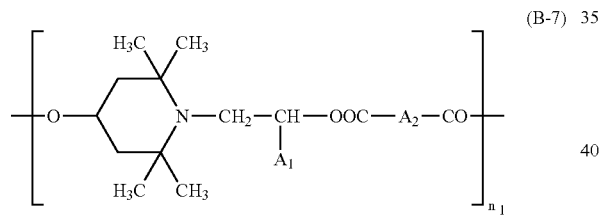
(B-7)

wherein $A_1$ is hydrogen or $C_1$–$C_4$alkyl, $A_2$ is a direct bond or $C_1$–$C_{10}$alkylene, and $n_1$ is a number from 2 to 50;

(β-8) at least one compound of the formulae (B-8-a) and (B-8-b)

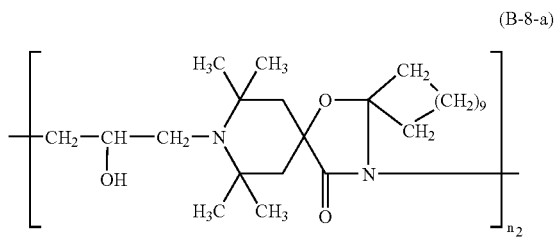
(B-8-a)

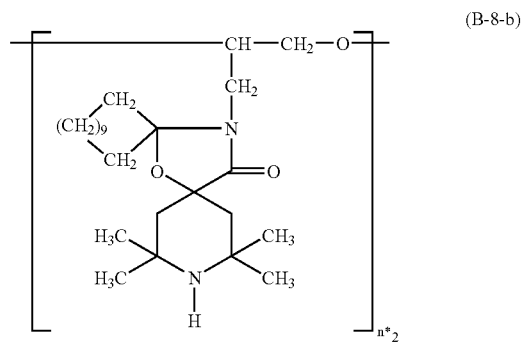
(B-8-b)

wherein $n_2$ and $n_2^*$ are a number from 2 to 50;

(β-9) a compound of the formula (B-9)

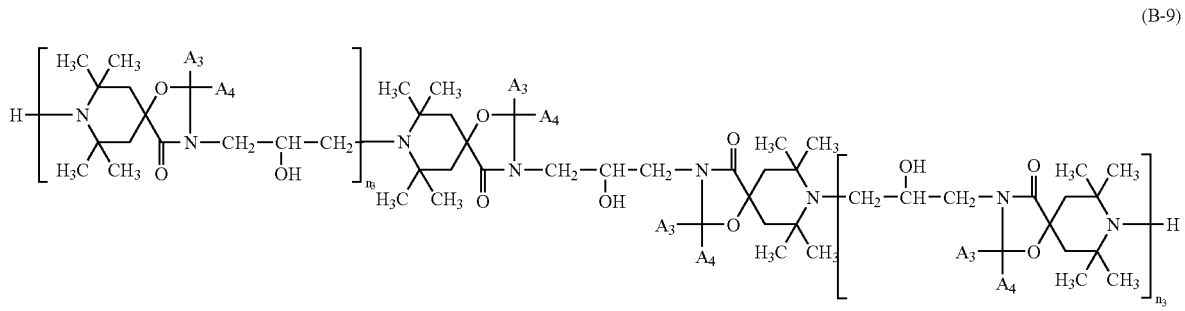
(B-9)

wherein $A_3$ and $A_4$ independently of one another are hydrogen or $C_1$–$C_8$alkyl, or $A_3$ and $A_4$ together form a $C_2$–$C_{14}$alkylene group, and the variables $n_3$ independently of one another are a number from 1 to 50; and (β-10) a compound of the formula (B-10)

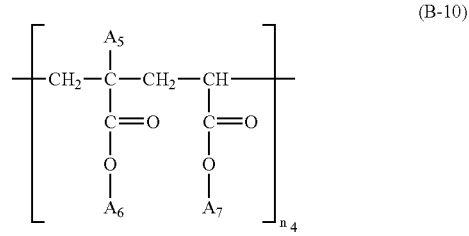

(B-10)

wherein $n_4$ is a number from 2 to 50, $A_5$ is hydrogen or $C_1$–$C_4$alkyl, the radicals $A_6$ and $A_7$ independently of one another are $C_1$–$C_4$alkyl or a group of the formula (b-I), with the proviso that at least 50% of the radicals $A_7$ are a group of the formula (b-I).

Examples of alkyl having up to 30 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl, docosyl and triacontyl. One of the preferred definitions of $E_1$, $E_8$, $E_{12}$, $E_{13}$, $E_{16}$, $E_{18}$, $E_{22}$, $E_{23}$, $E_{25}$, $E_{29}$, $R_{206}$, $R_{213}$, $R_{216}$, $R_{218}$, $R_{230}$ and $R_{232}$ is $C_1$–$C_4$alkyl, especially methyl. $R_{231}$ is preferably butyl.

Examples of alkoxy having up to 18 carbon atoms are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. One of the preferred meanings of $E_1$ is octoxy. $E_{24}$ is preferably $C_1$–$C_4$alkoxy and one of the preferred meanings of $R_{206}$ is propoxy.

Examples of $C_5$–$C_{12}$cycloalkyl are cyclopentyl, cyclohexyl, cycloheptyl, cyclooctyl and cyclododecyl. $C_5$–$C_8$Cycloalkyl, especially cyclohexyl, is preferred.

$C_1$–$C_4$Alkyl-substituted $C_5$–$C_{12}$cycloalkyl is for example methylcyclohexyl or dimethylcyclohexyl.

Examples of $C_5$–$C_{12}$cycloalkoxy are cyclopentoxy, cyclohexoxy, cycloheptoxy, cyclooctoxy, cyclodecyloxy and cyclododecyloxy. $C_5$–$C_8$Cycloalkoxy, in particular cyclopentoxy and cyclohexoxy, is preferred.

—OH— and/or $C_1$–$C_{10}$alkyl-substituted phenyl is for example methylphenyl, dimethylphenyl, trimethylphenyl, tert-butylphenyl or 3,5-di-tert-butyl-4-hydroxyphenyl.

Examples of $C_7$–$C_9$phenylalkyl are benzyl and phenylethyl.

$C_7$–$C_9$Phenylalkyl which is substituted on the phenyl radical by —OH and/or by alkyl having up to 10 carbon atoms is for example methylbenzyl, dimethylbenzyl, trimethylbenzyl, tert-butylbenzyl or 3,5-di-tert-butyl-4-hydroxybenzyl.

Examples of alkenyl having up to 10 carbon atoms are allyl, 2-methallyl, butenyl, pentenyl and hexenyl. Allyl is preferred. The carbon atom in position 1 is preferably saturated.

Examples of acyl containing not more than 8 carbon atoms are formyl, acetyl, propionyl, butyryl, pentanoyl, hexanoyl, heptanoyl, octanoyl, acryloyl, methacryloyl and benzoyl. $C_1$–$C_8$Alkanoyl, $C_3$–$C_8$alkenyl and benzoyl are preferred. Acetyl and acryloyl are especially preferred.

Examples of alkylene having up to 22 carbon atoms are methylene, ethylene, propylene, trimethylene, tetramethylene, pentamethylene, 2,2-dimethyltrimethylene, hexamethylene, trimethylhexamethylene, octamethylene and decamethylene.

An example of $C_3$–$C_{10}$alkylidene is the group

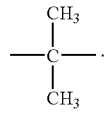

An example of $C_4$–$C_{10}$alkanetetrayl is 1,2,3,4-butanetetrayl.

An example of $C_5$–$C_7$cycloalkylene is cyclohexylene.

An example of $C_1$–$C_4$alkylenedi($C_5$–$C_7$cycloalkylene) is methylenedicyclohexylene.

An example of phenylenedi($C_1$–$C_4$alkylene) is methylene-phenylene-methylene or ethylene-phenylene-ethylene.

Where the radicals $R_{201}$, $R_{202}$ and $R_{203}$, together with the nitrogen atoms to which they are attached, form a 5- to 10-membered heterocyclic ring, this ring is for example

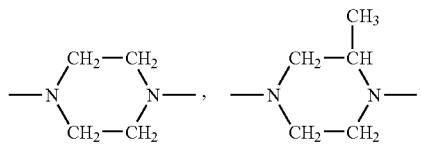

A 6-membered heterocyclic ring is preferred.

Where the radicals $R_{204}$ and $R_{205}$, together with the nitrogen atom to which they are attached, form a 5- to 10-membered heterocyclic ring, this ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

One of the preferred definitions of $R_{219}$ and $R_{223}$ is phenyl.

$R_{226}$ is preferably a direct bond.

$n_1$, $n_2$, $n_2^*$ and $n_4$ are preferably a number from 2 to 25, in particular 2 to 20.

$n_3$ is preferably a number from 1 to 25, in particular 1 to 20.

$b_1$ and $b_2$ are preferably a number from 2 to 25, in particular 2 to 20.

$b_3$ and $b_4$ are preferably a number from 1 to 25, in particluar 1 to 20.

$b'_5$ and $b'''_5$ are preferably 3 and $b''_5$ is preferably 2.

The compounds described above are essentially known and commercially available. All of them can be prepared by known processes.

The preparation of the compounds is disclosed, for example, in U.S. Pat. No. 5,679,733, U.S. Pat. No. 3,640,928, U.S. Pat. No. 4,198,334, U.S. Pat. No. 5,204,473, U.S. Pat. No. 4,619,958, U.S. Pat. No. 4,110,306, U.S. Pat. No. 4,110,334, U.S. Pat. No. 4,689,416, U.S. Pat. No. 4,408,051, SU-A-768,175 (Derwent 88-138,751/20), U.S. Pat. No. 5,049,604, U.S. Pat. No. 4,769,457, U.S. Pat. No. 4,356,307, U.S. Pat. No. 4,619,956, U.S. Pat. No. 5,182,390, GB-A-2,269,819, U.S. Pat. No. 4,292,240, U.S. Pat. No. 5,026,849, U.S. Pat. No. 5,071,981, U.S. Pat. No. 4,547,538, U.S. Pat. No. 4,976,889, U.S. Pat. No. 4,086,204, U.S. Pat. No.

6,046,304, U.S. Pat. No. 4,331,586, U.S. Pat. No. 4,108,829, U.S. Pat. No. 5,051,458, WO-A-94/12,544 (Derwent 94-177,274/22), DD-A-262,439 (Derwent 89-122,983/17), U.S. Pat. No. 4,857,595, U.S. Pat. No. 4,529,760, U.S. Pat. No. 4,477,615, CAS 136,504-96-6, U.S. Pat. No. 4,233,412, U.S. Pat. No. 4,340,534, WO-A-98/51,690 and EP-A-1,803.

The product (B-6) can be prepared analogously to known processes, for example by reacting a polyamine of formula (B-6-1) with cyanuric chloride in a molar ratio of from 1:2 to 1:4 in the presence of anhydrous lithium carbonate, sodium carbonate or potassium carbonate in an organic solvent such as 1,2-dichloroethane, toluene, xylene, benzene, dioxane or tert-amyl alcohol at a temperature of from −20° C. to +10° C., preferably from −10° C. to +10° C., in particular from 0° C. to +10° C., for from 2 to 8 hours, followed by reaction of the resultant product with a 2,2,6,6-tetramethyl-4-piperidylamine of the formula (B-6-2). The molar ratio of the 2,2,6,6-tetramethyl-4-piperidylamine to polyamine of the formula (B-6-1) employed is for example from 4:1 to 8:1. The quantity of the 2,2,6,6-tetramethyl-4-piperidylamine can be added in one portion or in more than one portion at intervals of a few hours.

The molar ratio of polyamine of the formula (B-6-1) to cyanuric chloride to 2,2,6,6-tetramethyl-4-piperidylamine of the formula (B-6-2) is preferably from 1:3:5 to 1:3:6.

The following example indicates one way of preparing a preferred product (B-6-a).

Example: 23.6 g (0.128 mol) of cyanuric chloride, 7.43 g (0.0426 mol) of N,N'-bis[3-aminopropyl]ethylenediamine and 18 g (0.13 mol) of anhydrous potassium carbonate are reacted at 5° C. for 3 hours with stirring in 250 ml of 1,2-dichloroethane. The mixture is warmed at room temperature for a further 4 hours. 27.2 g (0.128 mol) of N-(2,2,6,6-tetramethyl-4-piperidyl)butylamine are added and the resultant mixture is warmed at 60° C. for 2 hours. A further 18 g (0.13 mol) of anhydrous potassium carbonate are added and the mixture is warmed at 60° C. for a further 6 hours. The solvent is removed by distillation under a slight vacuum (200 mbar) and replaced by xylene. 18.2 g (0.085 mol) of N-(2,2,6,6-tetramethyl-4-piperidyl)butylamine and 5.2 g (0.13 mol) of ground sodium hydroxide are added, the mixture is heated at reflux for 2 hours and, for a further 12 hours, the water formed during the reaction is removed by azeotropic distillation. The mixture is filtered. The solution is washed with water and dried over $Na_2SO_4$. The solvent is evaporated and the residue is dried at 120–130° C. in vacuo (0.1 mbar). The desired product is obtained as a colourless resin.

In general, the product (B-6) can, for example, be represented by a compound of the formula (B-6-α), (B-6-β) or (B-6-γ). It can also be in the form of a mixture of these three compounds.

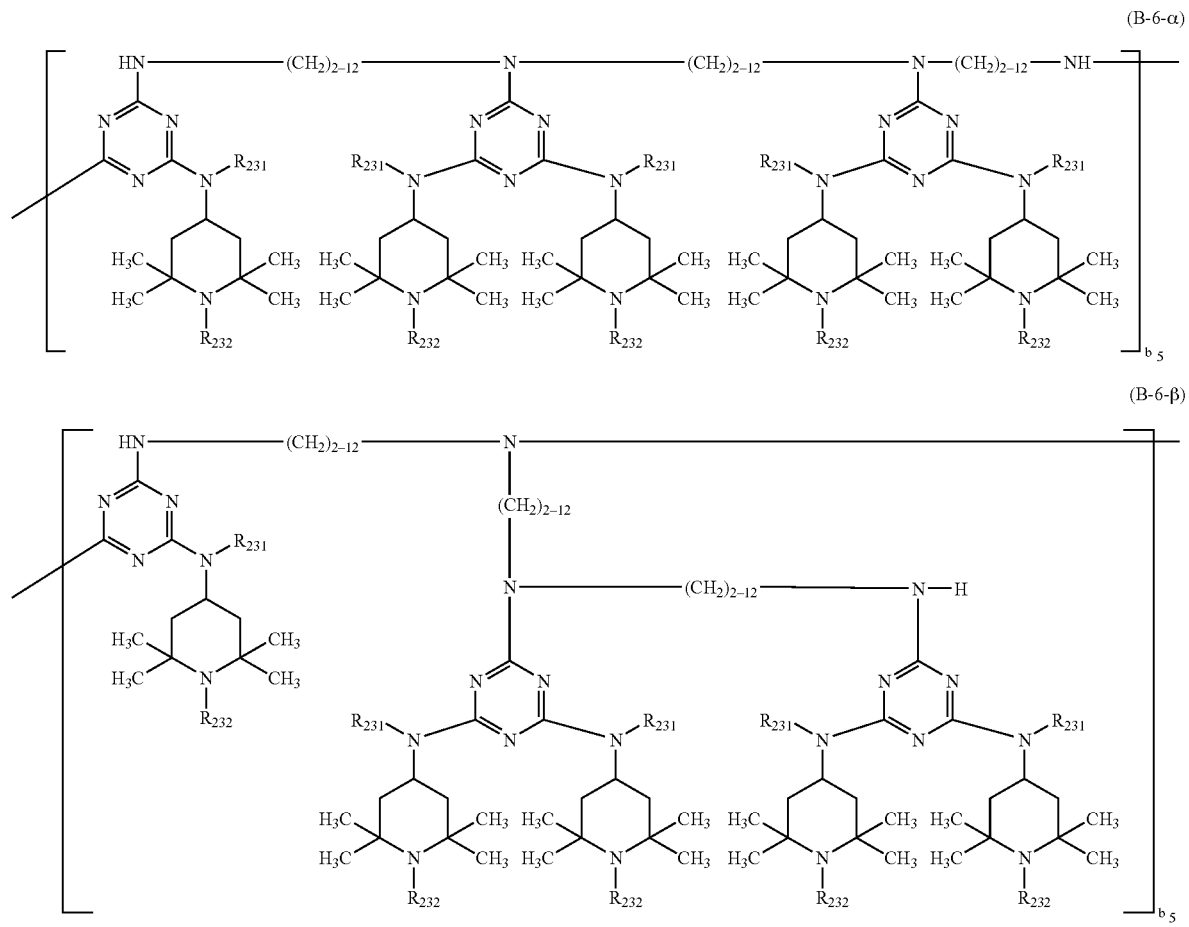

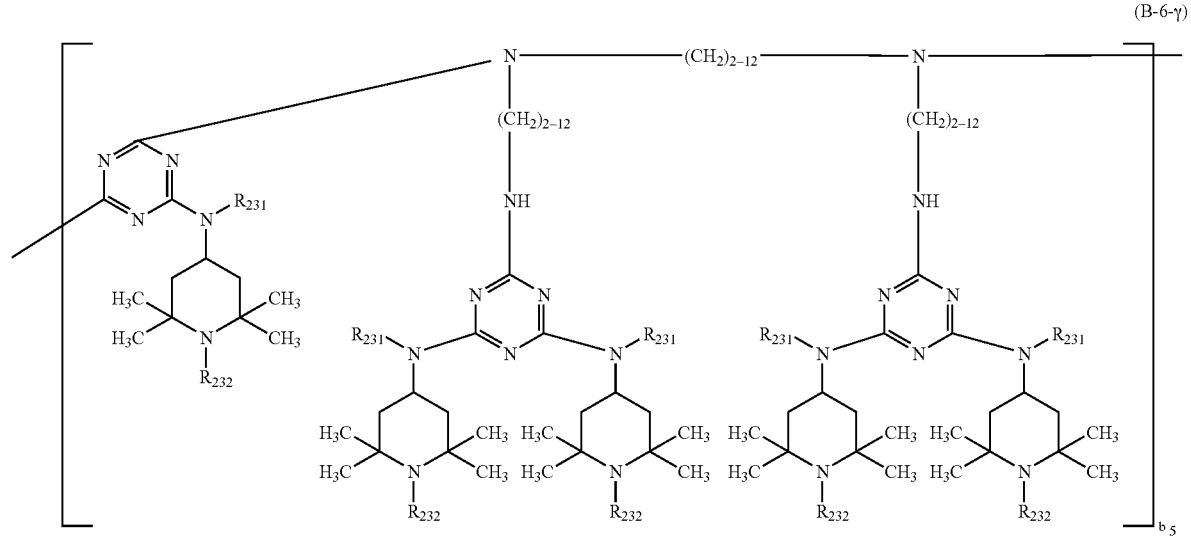
A preferred meaning of the formula (B-6-α) is
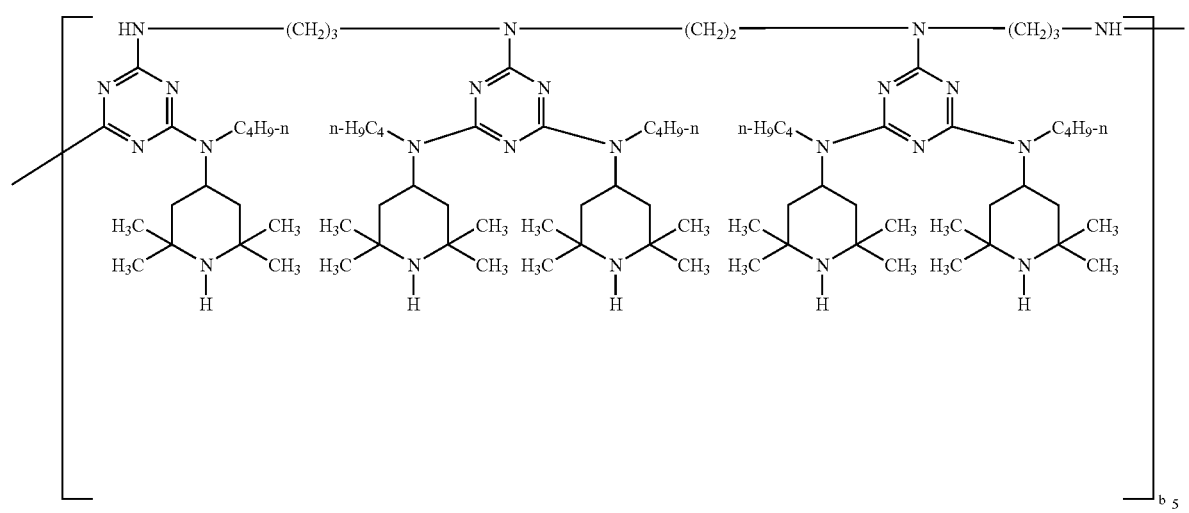

A preferred meaning of the formula (B-6-β) is

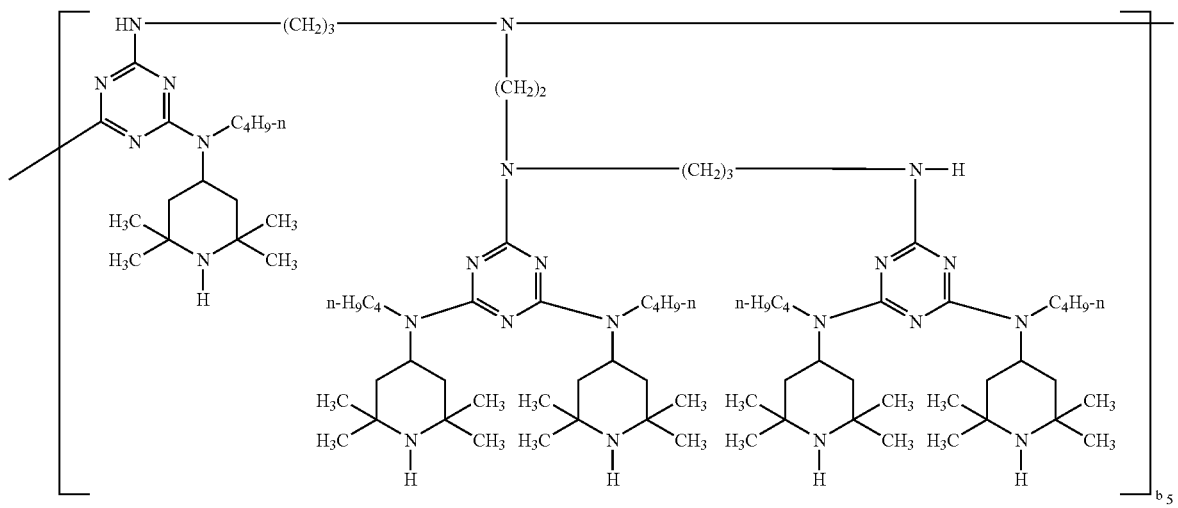

A preferred meaning of the formula (B-6-γ) is

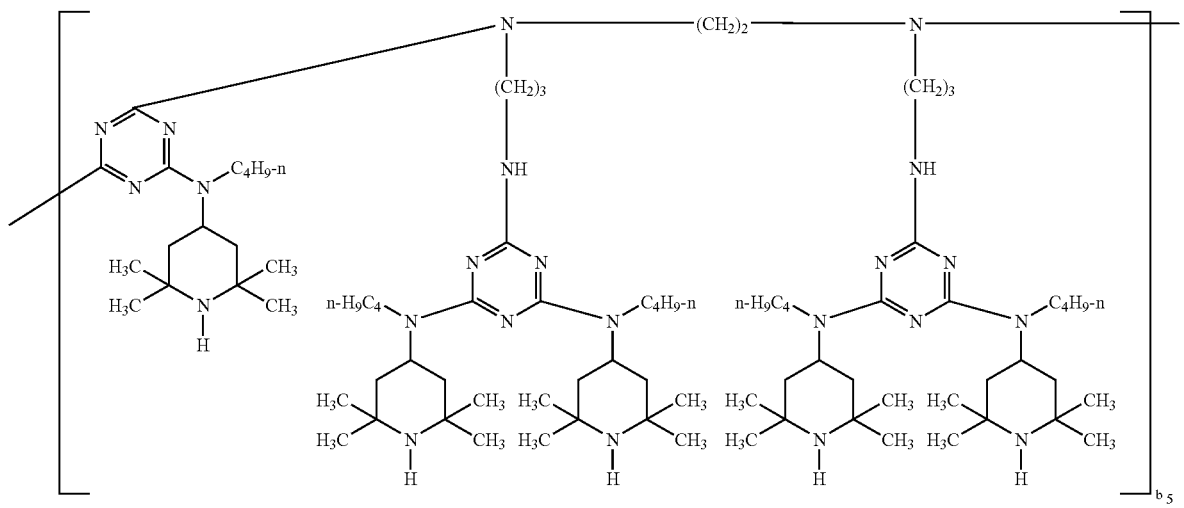

In the above formulae (B-6-α) to (B-6-γ), $b_5$ is preferably 2 to 20, in particular 2 to 10.

The sterically hindered amine compounds of component (c) are preferably selected from the group consisting of the following commercial products: DASTIB 845 (RTM), TINUVIN 770 (RTM), TINUVIN NOR 371 (RTM), TINUVIN 765 (RTM), TINUVIN 144 (RTM), TINUVIN 123 (RTM), TINUVIN 111 (RTM), TINUVIN 783 (RTM), TINUVIN 791 (RTM), MARK LA 52 (RTM), MARK LA 57 (RTM), MARK LA 62 (RTM), MARK LA 67 (RTM), HOSTAVIN N 20 (RTM), HOSTAVIN N 24 (RTM), SANDUVOR 3050 (RTM), DIACETAM 5 (RTM), SUMISORB TM 61 (RTM), UVINUL 4049 (RTM), SANDUVOR PR 31(RTM), GOODRITE UV 3034 (RTM), GOODRITE UV 3150 (RTM), GOODRITE UV 3159 (RTM), GOODRITE 3110×128 (RTM), UVINUL 4050 H (RTM), CHIMASSORB 944 (RTM), CHIMASSORB 2020 (RTM), CYASORB UV 3346 (RTM), CYASORB UV 3529 (RTM), DASTIB 1082 (RTM), CHIMASSORB 119 (RTM), UVASIL 299 (RTM), UVASIL 125 (RTM), UVASIL 2000 (RTM), UVINUL 5050 H (RTM), LICHTSCHUTZSTOFF UV 31 (RTM), LUCHEM HA B 18 (RTM), MARK LA 63 (RTM), MARK LA 68 (RTM), UVASORB HA 88 (RTM), TINUVIN 622 (RTM), HOSTAVIN N 30 (RTM) and FERRO AM 806 (RTM).

Particularly preferred are TINUVIN 770 (RTM), TINUVIN NOR 371 (RTM), TINUVIN 791 (RTM), TINUVIN 622 (RTM), TINUVIN 783 (RTM), CHIMASSORB 944 (RTM), CHIMASSORB 2020 (RTM) and CHIMASSORB 119 (RTM).

Most preferred is Tinuvin 770 (RTM), TINUVIN NOR 371 (RTM) and TINUVIN 791 (RTM).

The meanings of the terminal groups which saturate the free valences in the compounds of the formulae (B-1), (B-3), (B-4), (B-5), (B-6-α), (B-6-β), (B-6-γ), (B-7), (B-8-a), (B-8- b) and (B-10) depend on the processes used for their preparation. The terminal groups can also be modified after the preparation of the compounds.

If the compounds of the formula (B-1) are prepared by reacting a compound of the formula

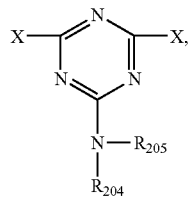

in which X is, for example, halogen, in particular chlorine, and $R_{204}$ and $R_{205}$ are as defined above, with a compound of the formula

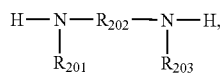

in which $R_{201}$, $R_{202}$ and $R_{203}$ are as defined above, the terminal group bonded to the diamino radical is hydrogen or

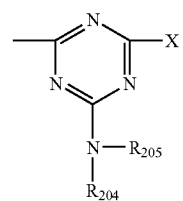

and the terminal group bonded to the triazine radical is X or

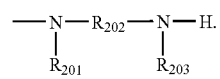

If X is halogen, it is advantageous to replace this, for example, by —OH or an amino group when the reaction is complete. Examples of amino groups which may be mentioned are pyrrolidin-1-yl, morpholino, —NH$_2$, —N(C$_1$–C$_8$)alkyl)$_2$ and —NR(C$_1$–C$_8$alkyl), in which R is hydrogen or a group of the formula (b-I).

The compounds of the formula (B-1) also cover compounds of the formula

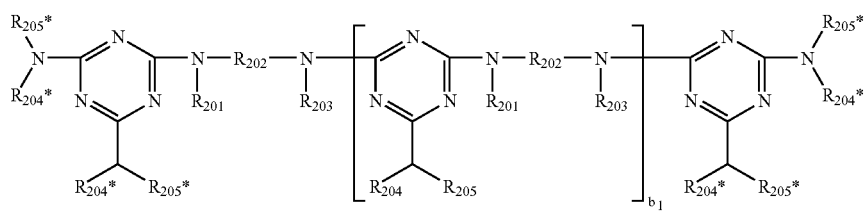

wherein $R_{201}$, $R_{202}$, $R_{203}$, $R_{204}$, $R_{205}$ and $b_1$ are as defined above and $R_{204}*$ has one of the meanings of $R_{204}$ and $R_{205}*$ has one of the meanings of $R_{205}$.

One of the particularly preferred compounds of the formula (B-1) is

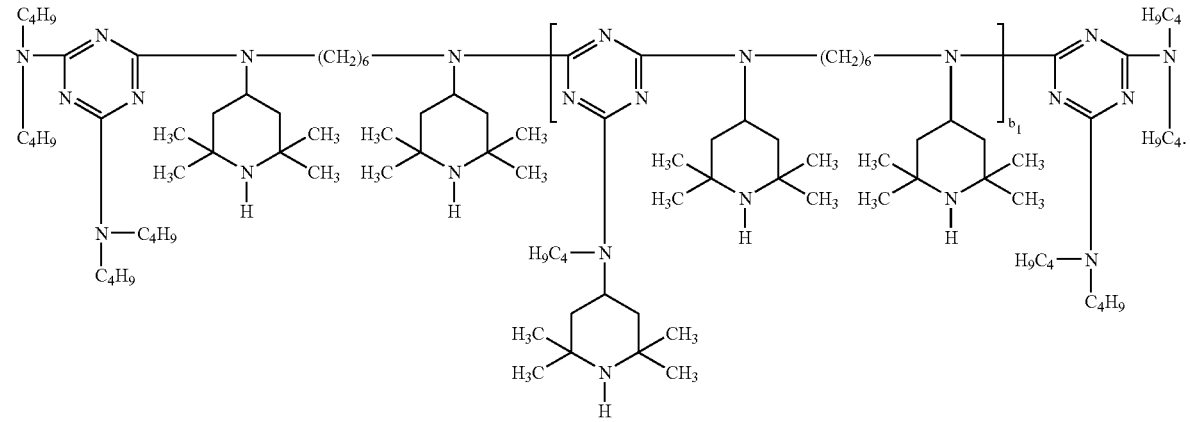

The preparation of this compound is described in Example 10 of U.S. Pat. No. 6,046,304.

In the compounds of the formula (B-3), the terminal group bonded to the silicon atom can be, for example, $(R_{14})_3Si$—O—, and the terminal group bonded to the oxygen can be, for example, —$Si(R_{14})_3$.

The compounds of the formula (B-3) can also be in the form of cyclic compounds if $b_2$ is a number from 3 to 10, i.e. the free valences shown in the structural formula then form a direct bond.

In the compounds of the formula (B-4), the terminal group bonded to the 2,5-dioxopyrrolidine ring is, for example, hydrogen, and the terminal group bonded to the —$C(R_{223})(R_{224})$— radical is, for example,

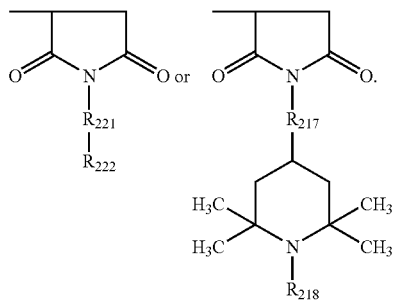

In the compounds of the formula (B-5), the terminal group bonded to the carbonyl radical is, for example,

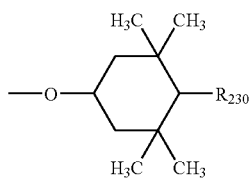

and the terminal group bonded to the oxygen radical is, for example,

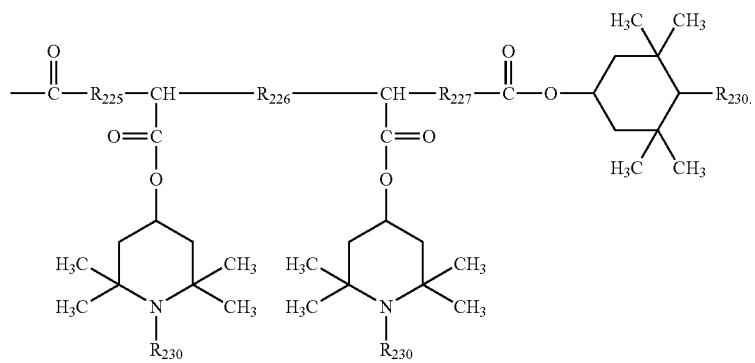

In the compounds of the formulae (B-6-α), (B-6-β) and (B-6-γ), the terminal group bonded to the triazine radical is, for example, Cl or a

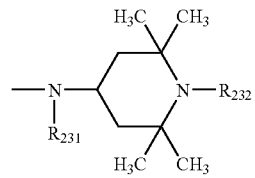

group, and the terminal group bonded to the amino radical is, for example, hydrogen or a

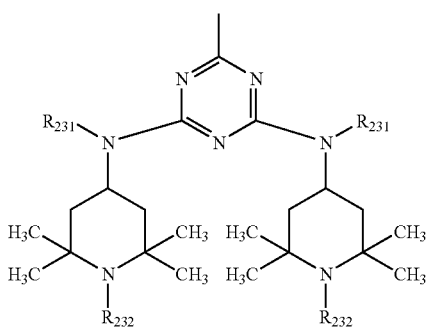

group.

If the compounds of the formula (B-7) are prepared, for example, by reacting a compound of the formula

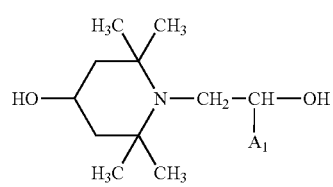

in which $A_1$ is hydrogen or methyl, with a dicarboxylic acid diester of the formula Y—OOC-$A_2$-COO—Y, in which Y is, for example, methyl, ethyl or propyl, and $A_2$ is as defined above, the terminal group bonded to the 2,2,6,6-tetramethyl-4-oxypiperidin-1-yl radical is hydrogen or —CO—A$_2$—COO—Y, and the terminal group bonded to the diacyl radical is —O—Y or

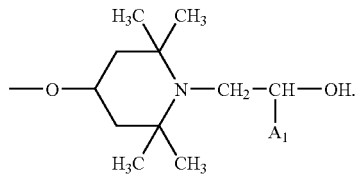

In the compounds of the formula (B-8-a), the terminal group bonded to the nitrogen can be, for example, hydrogen and the terminal group bonded to the 2-hydroxypropylene radical can be, for example, a

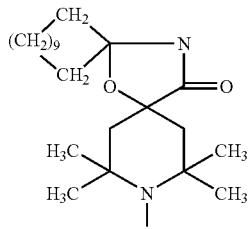

group.

In the compounds of the formula (B-8-b), the terminal group bonded to the dimethylene radical can be, for example, —OH, and the terminal group bonded to the oxygen can be, for example, hydrogen. The terminal groups can also be polyether radicals.

In the compounds of the formula (B-10), the end group bonded to the —CH$_2$— residue can be, for example, hydrogen and the end group bonded to the —CH(CO$_2$A$_7$) residue can be, for example, —CH=CH—COOA$_7$.

Specific examples for the sterically hindered amines are bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl )-1,3,5-triazine and 1,2-bis(3-aminopropylamino) ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethyl-4-piperidyl)pyrrolidin-2,5-dione, 3-dodecyl- 1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-te-tramethyl-4-piperidyl) hexamethylenediamine, diester of 4-methoxy-methylenemalonic acid with 1,2,2,6,6-pentamethyl-4-hydroxypiperidine, poly[methylpropyl-3-oxy-4-(2,2,6,6-tetramethyl-4-piperidyl)]siloxane and reaction product of maleic acid anhydride-α-olefin-copolymer with 2,2,6,6-tetramethyl-4-aminopiperidine, 1,2,2,6,6-pentamethyl-4-aminopiperidine or a compound

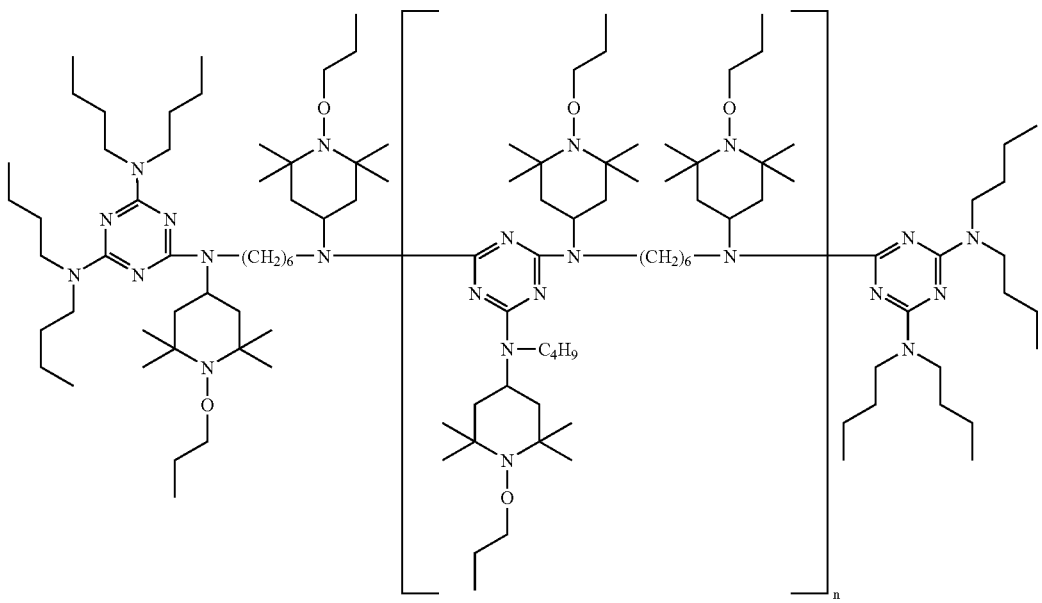

in which n is from 1 to 15, disclosed in example 2 of U.S. Pat. No. 6,117,995.

The sterically hindered amines mentioned above are known and are largely items of commerce. They are for example used in an amount from 0.005 to 5%, preferably from 0.1 to 2% by weight based on the weight of the polymer.

Commercial examples are Tinuvin® 111, 783, 494, 492, NOR 371, 944, 622 from Ciba Specialty Chemicals Inc.; Hostavin® N30, N391 from Clariant Inc.; Cyasorb® 3346, 3529, 1084, Cyasorb® THT 6435, THT6460, THT4611 from Cytech Inc.; Mark® LA62 from Adeka Argus Inc. or Sigma HA88 from 3V Sigma Inc.

In some cases it may be advantageous to add additionally metal oxides or hydroxides. Examples are the oxides of zinc, aluminum, calcium or magnesium, or the hydroxides of zinc, aluminum or calcium, in particular zinc oxide (ZnO), zinc hydroxide ($Zn(O)_2$), ortho or meta aluminum ($Al(OH)_3$), alpha or gamma-aluminum oxide ($Al_2O_3$), or magnesium oxide (MgO), Special preference is given to ZnO, $Zn(OH)_2$ or MgO. Metal carboxylates may optionally also be added. These are mainly salts of Al, Ba, Mg, Sr or Zn. Preferred are salts of aluminum, calcium, magnesium or zinc, especially of $C_{12}$–$C_{18}$ carboxylic acids. Preferred are calcium salts, for example calcium stearate. Hydrocalcites are in general preferred.

The commercial sterically hindered amines given above are partially blends with UV-absorbers (THT series) or contain further processing additives, such as ZnO, MgO, Ca-stearate, Zn-stearate.

The condensation product is of formula (I) and/or (II)

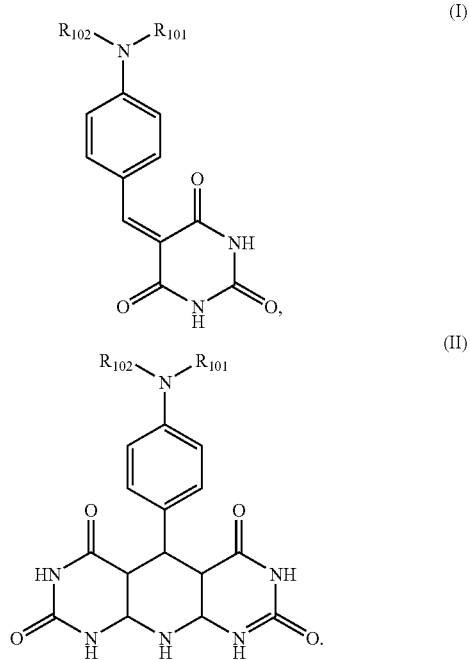

The reaction and the products are known and have the following CAS numbers: (I) is No. 1753-47-5 and (II) is No. 152734-34-4. The condensation reaction is typically carried out in a solvent, such as for example ethanol. Depending on the amount of additional $NH_4OH$ the formation of product (I) or (II) is favored. The condensation temperature range is typically from 30° C. to 100° C. The condensation is usually carried out at atmospheric pressure. Preferably $R_{101}$ and $R_{102}$ are methyl.

The polymeric composition is for example in the form of a film used in agricultural applications. It may be a self-supporting film construction or a film may be laminated onto, for example, glass or polycarbonate. When used in agricultural applications the film is preferably used for greenhouses, as mulch film or small tunnel cover. The film can form the cover of a greenhouse, protecting the plants from the influences of the surrounding or the film can be used in the inside of a greenhouse to cover or protect the plants or a part of the plants from influences originating from inside, such as artificial watering or spraying of herbicides and/or insecticides.

Preferably the condensation product is present in an amount of from 0.005% to 10%, more preferably of from 0.05% to 4% and most preferably of from 0.1% to 2.5% by weight based on the weight of the thermoplastic polymer.

The thermoplastic polymer film is preferably transparent. Transparent means in the context of the present invention that more than 50%, preferably more than 70% of the incident radiation in the visible range between 400 and 720 nm pass through the polymer film. This is, for example, measured by measuring the total incident radiation (directional and diffuse) and the total transmitted radiation behind the film (directional and diffuse).

The level of transparency necessary for an optimum plant growth depends on the latitude. For example, near the equator less transparency is desirable than in the temperate zone.

The thermoplastic polymer film can be made from a variety of polymers. Examples are given below.

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethyleneacrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

Homopolymers and copolymers from 1.)-4.) may have any stereostructure including syndio-tactic, isotactic, hemi-isotactic or atactic; where atactic polymers are preferred. Stereoblock polymers are also included.

5. Polystyrene, poly(p-methylstyrene), poly($\alpha$-methylstyrene).

6. Aromatic homopolymers and copolymers derived from vinyl aromatic monomers including styrene, $\alpha$-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or polym-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Preferred is a thermoplastic polymer selected from the group consisting of a polyolefin, a polyester, a polyvinylalcohol, a polyvinylacetate and a polycarbonate.

Suitable thermoplastic polymer are also starch modified polyolefines, starch based polymer composites, biopolymers such as polycaprolactone, polylactic acid, polyglycollic acid, polyhydroxybutyrate-valerate, polybutylene succinate, polyvinyl alcohol, polyhydroxy-alcanoate or polyethylene adipate.

Particularly preferred are polyolefins or polyvinylacetates, in particular (PE), polyethylene, (LDPE), low density polyethylene, linear low density polyethylene (LLDPE), (VLDPE), (ULDPE) and ethylvinylacetate (EVA).

Preferably the thermoplastic polymer is in the form of a film with a thickness from 10μ to 300μ, in particular from 10μ to 200μ.

In a specific embodiment of the invention the film is a multilayer construction of between 2 and 7 polymer layers containing the components b), c1), c2) or c3) as described above in at least 1 layer.

In this case a polymer composition of the invention containing a relatively large amount of the condensation product, of the UV-absorber or/and the sterically hindered amine, for example 1–15% by weight, is applied in a thin layer (10–20μ) to a shaped article made from a polymer containing little or no condensation product and other additive. Application can be made at the same time as the shaping of the base article, for example by coextrusion. Alternatively, application can be made to the base article after it has been shaped, for example by lamination with a film or by coating with a solution.

The thermoplastic polymer film may contain an additional additive selected from the group consisting of a phenolic antioxidant, a phosphite or phosphonite, a further fluorescent dye or pigment, a processing aid, a filler or reinforcing material and an antifog additive.

Examples for further additives are given below.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis-(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)-hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyidiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis-(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. Other UV Absorbers and Light Stabilisers 2.1. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.2. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.3. Nickel compounds, for example nickel complexes of 2,2'-thio-bis-[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butyl-phenyl) 4,4'-biphenylene diphosphonite, 6-isooctyloxy-2,4,8,10-tetra-tert-butyl-12H-dibenz-[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-di-benz[d,g]-1,3,2-dioxaphosphocin, 2,2',2''-nitrilo[triethyltris(3,3',5,5'-tetra-tert-butyl-1,1'-biphenyl- 2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

Especially preferred are the following phosphites:
Tris(2,4-di-tert-butylphenyl) phosphite (Irgafos®168, Ciba-Geigy), tris(nonylphenyl) phosphite,

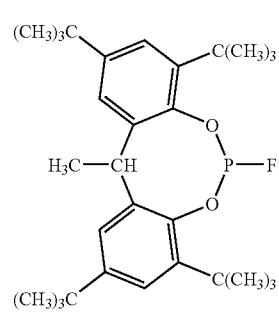

(A)

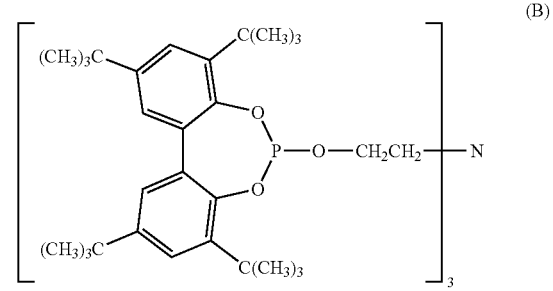

(B)

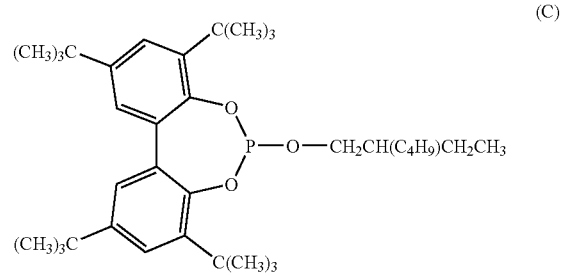

(C)

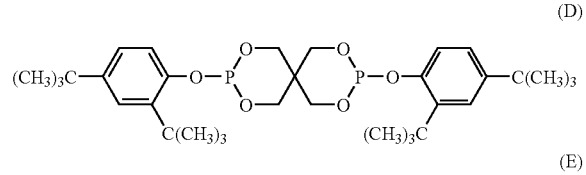

(D)

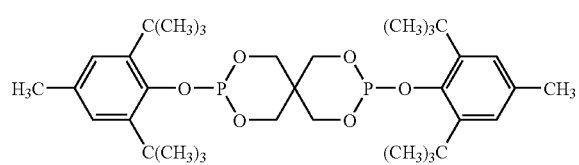

(E)

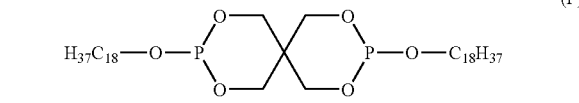

(F)

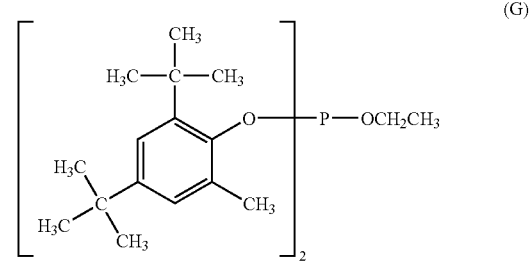

(G)

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers). Especially preferred are 1,3:2,4-bis(3',4'-dimethylbenzylidene)sorbitol, 1,3:2,4-di(paramethyldibenzylidene)sorbitol, und 1,3:2,4-di(benzylidene)sorbitol.

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents, oxygen absorbers and blowing agents.

13a) Anti-fog additives. for example glycerol esters, polyglycerolesters, sorbitan esters and their ethoxylates, nonyl phenol ethoxylates, alcohol ethoxylates (see Plastics Additives Handbook, edited by H. Zweifel, 5$^{th}$ edition, Hanser 2001, pages 609–626).

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-di-methylphenyl)-5,7-di-tert-butyl-benzofuran-2-one.

The nature and amount of the further additives added are determined by the nature of the substrate to be stabilized and its intended use; in many cases from 0.1 to 5% by weight is used, based on the polymer to be stabilized.

The additives of the invention and optional further components may be added to the polymer material individually or mixed with one another. If desired, the individual components can be mixed with one another before incorporation into the polymer for example by dry blending, compaction or in the melt.

The incorporation of the additive of the invention and optional further components into the polymer is carried out by known methods such as dry blending in the form of a powder, or wet mixing in the form of solutions, dispersions or suspensions for example in an inert solvent, water or oil. The additive of the invention and optional further additives may be incorporated, for example, before or after molding or also by applying the dissolved or dispersed additve or additive mixture to the polymer material, with or without subsequent evaporation of the solvent or the suspension/dispersion agent. They may be added directly into the processing apparatus (e.g. extruders, internal mixers, etc), e.g. as a dry mixture or powder or as solution or dispersion or suspension or melt.

The incorporation can be carried out in any heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The addition of the additive or additive blend to the polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion, Vol. 1 Grundlagen*, Editors F. Hensen, W. Knappe, H. Potente, 1989, pp. 3–7, ISBN: 3-446-14339-4 (*Vol. 2 Extrusionsanlagen* 1986, ISBN 3-446-14329-7).

For example, the screw length is 1–60 screw diameters, preferably 35–48 screw diameters. The rotational speed of the screw is preferably 10–600 rotations per minute (rpm), very particularly preferably 25–300 rpm.

The maximum throughput is dependent on the screw diameter, the rotational speed and the driving force.

If a plurality of components are added, these can be premixed or added individually.

The additive of the invention and optional further additives can also be sprayed onto the polymer material. They are able to dilute other additives (for example the conventional additives indicated above) or their melts so that they can be sprayed also together with these additives onto the material. Addition by spraying during the deactivation of the polymerization catalysts is particularly advantageous; in this case, the steam evolved may be used for deactivation of the catalyst. In the case of spherically polymerized polyolefins it may, for example, be advantageous to apply the additives of the invention, optionally together with other additives, by spraying.

The additives of the invention and optional further additives can also be added to the polymer in the form of a masterbatch ("concentrate") which contains the components in a concentration of, for example, about 1% to about 40% and preferably 2% to about 20% by weight incorporated in a polymer. The polymer must not be necessarily of identical structure than the polymer where the additives are added finally. In such operations, the polymer can be used in the form of powder, granules, solutions, suspensions or in the form of latices.

Incorporation can take place prior to or during the shaping operation, or by applying the dissolved or dispersed compound to the polymer, with or without subsequent evaporation of the solvent. In the case of elastomers, these can also be stabilized as latices. A further possibility for incorporating the additives of the invention into polymers is to add them before, during or directly after the polymerization of the corresponding monomers.

The films can be coextruded by film extrusion such as blown film extrusion or by cast film extrusion or they can be laminated and they can include layers based on polymers such as polyamide (PA 6 or 6,6 or 11 or 12 or 6/6,6 copolymer including OPA), polyethylene terephtalate (PET including OPET), polyethylene naphtalate (PEN), ethylene vinyl alcohol (EvOH), polypropylene (including OPP), ethylene acrylic acid copolymers and their salts, ethylene methacrylic acid copolymers and their salts, or Polyvinylidenchloride (PVDC) or aluminum foil. The films can also be coated with the above polymers or silicone-based coatings (e.g. SiOx) or aluminum oxide or any other coating applied by plasma, web coating or electron-beam coating.

A further aspect of the invention is a process for enhancing plant growth, comprising exposing a plant to actinic radiation behind or under a thermoplastic polymer composition in the form of a film for greenhouses and small tunnel covers, a film or a filament for shading nets and screens, a mulch film, a non-woven or molded article for the protection of young plants containing a condensation product of

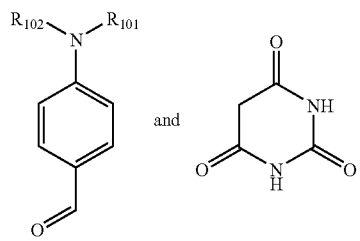

wherein $R_{101}$ and $R_{102}$ are independently hydrogen or $C_1$–$C_{18}$ alkyl;
a UV-absorber; or
a sterically hindered amine, containing at least one radical of the formula

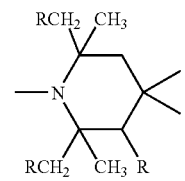

in which R is hydrogen or methyl; or
a UV-absorber and a sterically hindered amine, containing at least one radical of the formula

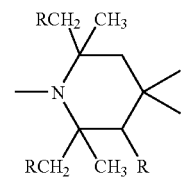

in which R is hydrogen or methyl.

Yet another aspect of the invention is the use of the condensation product of

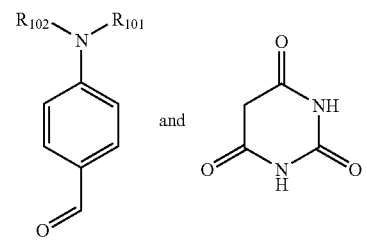

wherein $R_{101}$ and $R_{102}$ are independently hydrogen or $C_1$–$C_{18}$ alkyl together with
a UV-absorber; or
a sterically hindered amine, containing at least one radical of the formula

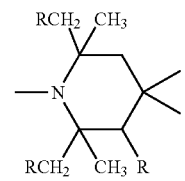

in which R is hydrogen or methyl; or
a UV-absorber and a sterically hindered amine, containing at least one radical of the formula

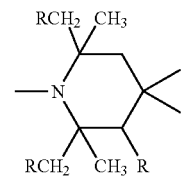

in which R is hydrogen or methyl.

as plant growth enhancing additive in thermoplastic polymers for agricultural applications in the form of films for greenhouses and small tunnel covers, films or filaments for shading nets and screens, mulch films, non-wovens or molded articles for the protection of young plants.

Definitions and preferences have already been given for the composition and apply also for the process and use.

Nets can for example be used for increased ventilation (and as a barrier to insects) or for it's shading and energy savings.

Nets can be manufactured in different ways. One is to cut films in small stripes which are then woven. Another possibility is to start with monofilament fibers, which are subsequently woven. A further possibility for making shading nets (also called screens) is more complex. A net is formed from woven monofilament fibers with tapes woven through this net. These tapes can be based on aluminium and/or a broad variety of polymers. In some cases, the monofilament net can be laminated on 1 or both sides with e.g. PE.

In general greenhouses and small tunnel covers are preferred. The plants, which are grown in greenhouses and small tunnel covers and the growth of which can be enhanced by the instant invention are for example flowers, legumes, fruits and crop.

The following examples illustrate the invention.

EXAMPLE 1

Film Preparation and Additives Used

A three layer LDPE/EVA industrial film is prepared by blow molding having the following structure: 200µ thickness, 50µ EVA 5%, 100µ EVA 14% and 50µ EVA 5%.

The following additives are added in all three layers:
Film A) 1% compound 100, 1% Tinuvin NOR 371®, 0.35% Chimassorb 81, 0.35% Tinuvin 327
Film B)—1% Tinuvin NOR 371®, 0.35% Chimassorb 81, 0.35% Tinuvin 327
Compound 100 is the condensation product of 4-dimethylaminobenzaldehyde and barbituric acid;
Tinuvin NOR 371® is a commercial sterically hindered amine from Ciba Specialty Chemicals Inc.
Chimassorb 81 is a commercial benzophenone type UV-absorber from Ciba Specialty Chemicals Inc.;
Tinuvin 327 is a commercial benzotriazole type UV-absorber from Ciba Specialty Chemicals Inc.
% is weight % based on the weight of the total polymer.
Film A contains the photoselective additive compound 100.
Film B is without the photoselective compound 100.

Agricultural Tests

Both films are compared in different agricultural tests performed in Pescia (Pisa, Italy).

The plants investigated are LILIUM and LIMONIUM.

Two different cultivars have been tested for Lilium: 'O sole mio' and 'Stargazer'

For Limonium the following cultivars have been tested: 'Emille' and 'Tall Emile'

Lilium and Limonium have been grown under small tunnels starting from the first week of April 2001.

Lilium harvesting started at the end of May 2001; Limonium harvesting started at the end of July 2001.

The cultivation conditions are the standard conditions used in the region.

Effects on Lilium and Limonium

The results are given in the following Tables.

TABLE 1

| Results for Lilium | |
| --- | --- |
| CV 'O sole mio' | Average length of stems (cm) |
| Film A | 47.7 |
| Film B | 37.6 |
| CV 'Star Gazer' | Average length of stems |
| Film A | 72.3 |
| Film B | 32.7 |

TABLE 2

| Results for Limonium: | | |
| --- | --- | --- |
| CV 'Emille' | Stems per plant | Average length of stems (cm) |
| Film A | 6.2 | 38.0 |
| Film B | 3.9 | 26.1 |
| CV 'Tall Emile' | Stems per plant | Average length of stems |
| Film A | 4.0 | 49.1 |
| Film B | 2.4 | 40.8 |

The effect on growth of lilium and limonium of the photoselective compound 100 is evident.

Effects on Carnation

Two cultivars, namely 'Jack' and 'Samuela', have been grown under two greenhouses one with film A and the other with film B. The cultivation started on the 18 Sep. 2001 and harvesting started on the 3, Oct. 2001. The cultivation conditions are the standard conditions used in the region.

TABLE 3

| Results for Carnation | | |
| --- | --- | --- |
| CV 'Jack' | Number of flowers per m$^2$ | Average length of stems (cm) |
| Film A | 27.2 | 95.2 |
| Film B | 17.4 | 87.1 |
| CV 'Samuela' | Number of flowers per m$^2$ | Average length of stems |
| Film A | 55.7 | 89.4 |
| Film B | 40.3 | 81.0 |

The effect on the production and quality of carnation by the photoselective compound 100 is evident.

EXAMPLE 2

Film Preparation and Additives Used

200µ thick polyethylene monolayer films are prepared by blow molding by means of a Dolci blow extruder.

The following additives are added to the films:

| Film A) 1% compound 100, | 0.7% Tinuvin NOR 371 ® |
| --- | --- |
| Film B) | 0.7% Tinuvin NOR 371 ® |

Compound 100 is the condensation product of 4-dimethylaminobenzaldehyde and barbituric acid;

Tinuvin NOR 371® is a commercial sterically hindered amine from Ciba Specialty Chemicals Inc.
% is weight % based on the weight of the polymer.
Film A contains the photoselective additive compound 100.
Film B is without the photoselective compound 100.

Agricultural Tests

Both films are compared in different agricultural tests performed in Pisa (Italy).

The plants investigated are *Anthirrhium majus*.

40 plants of *Anthirrhium majus* have been planted in flowerpots under experimental small tunnels during the second week of September 2002. The first stages of growth have been monitored, by assessing some standard parameters of growth like fresh and dry weight and stem height.

The cultivation conditions are the standard conditions used in the region.

The average parameters gathered at the harvesting of Anthirrhium majus are reported in Table 4.

TABLE 4

Results for *Anthirrhium majus*

|  | Height (cm) | Dry weight (g) | Fresh weight (g) |
|---|---|---|---|
| Film A | 90.6 | 7.08 | 45.6 |
| Film B | 80.4 | 5.9 | 37.9 |

The invention claimed is:

1. A polymer composition for agricultural applications in the form of films for greenhouses and small tunnel covers, films or filaments for shading nets and screens, mulch films, non-wovens or molded articles for the protection of young plants comprising
   a) a thermoplastic polymer;
   b) the condensation product of

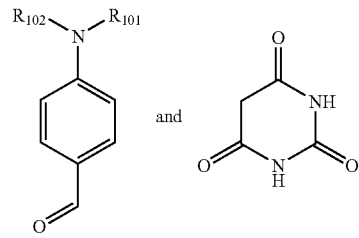

wherein $R_{101}$ and $R_{102}$ are independently hydrogen or $C_1$–$C_{18}$ alkyl; and
   c1) a UV-absorber; or
   c2) a sterically hindered amine containing at least one radical of the formula

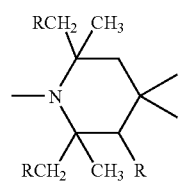

in which R is hydrogen or methyl; or
   c3) a UV-absorber and a sterically hindered amine containing at least one radical of the formula

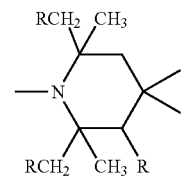

in which R is hydrogen or methyl.

2. A polymer composition according to claim 1 wherein the UV-absorber is selected from the group consisting of benzotriazole UV-absorbers, benzophenone UV-absorbers, hydroxyphenyl-triazine UV-absorbers oxalic anilide UV-absorbers and mixtures thereof.

3. A polymer composition according to claim 2 wherein the hydroxybenzophenone is of formula I

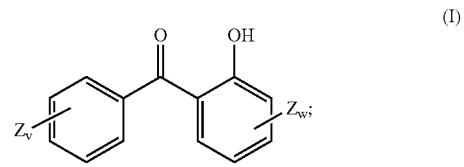

the 2-hydroxyphenylbenzotriazole is of formula IIa, IIb or IIc

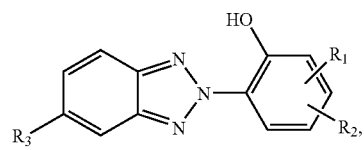

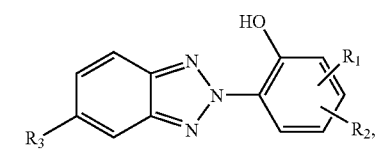

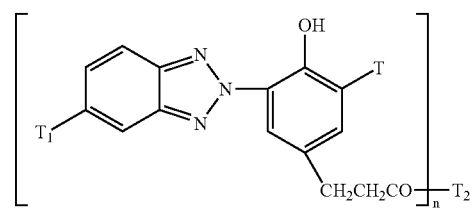

the 2-hydroxyphenyltriazine is of formula III

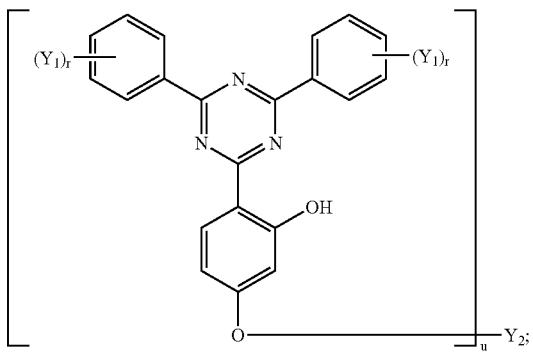

(III)

and the oxanilide is of formula (IV)

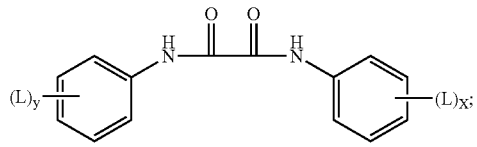

(IV)

wherein in the compounds of the formula (I) v is an integer from 1 to 3 and w is 1 or 2 and the substituents Z independently of one another are hydrogen, halogen, hydroxyl or alkoxy having 1 to 12 carbon atoms;

in the compounds of the formula (IIa), $R_1$ is hydrogen, alkyl having 1 to 24 carbon atoms, phenylalkyl having 1 to 4 carbon atoms in the alkyl moiety, cycloalkyl having 5 to 8 carbon atoms or a radical of the formula

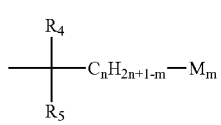

in which $R_4$ and $R_5$ independently of one another are alkyl having in each case 1 to 5 carbon atoms, or $R_4$, together with the radical $C_nH_{2n+1-m}$, forms a cycloalkyl radical having 5 to 12 carbon atoms, m is 1 or 2, n is an integer from 2 to 20 and M is a radical of the formula —$COOR_6$ in which $R_6$ is hydrogen, alkyl having 1 to 12 carbon atoms, alkoxyalkyl having in each case 1 to 20 carbon atoms in the alkyl moiety and in the alkoxy moiety or phenylalkyl having 1 to 4 carbon atoms in the alkyl moiety, $R_2$ is hydrogen, halogen, alkyl having 1 to 18 carbon atoms, and phenylalkyl having 1 to 4 carbon atoms in the alkyl moiety, and $R_3$ is hydrogen, chlorine, alkyl or alkoxy having in each case 1 to 4 carbon atoms or —$COOR_6$ in which $R_6$ is as defined above, at least one of the radicals $R_1$ and $R_2$ being other than hydrogen;

in the compounds of the formula (IIb)

T is hydrogen or alkyl having 1 to 6 carbon atoms, $T_1$ is hydrogen, chlorine or alkyl or alkoxy having in each case 1 to 4 carbon atoms, n is 1 or 2 and, if n is 1, $T_2$ is chlorine or a radical of the formula —$OT_3$ or

and, if n is 2, $T_2$ is a radical of the formula

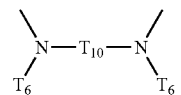

or —O-$T_9$-O—;

in which $T_3$ is hydrogen, alkyl which has 1 to 18 carbon atoms and is unsubstituted or substituted by 1 to 3 hydroxyl groups or by —$OCOT_6$, alkyl which has 3 to 18 carbon atoms, is interrupted once or several times by —O— or —$NT_6$- and is unsubstituted or substituted by hydroxyl or —$OCOT_6$, cycloalkyl which has 5 to 12 carbon atoms and is unsubstituted or substituted by hydroxyl and/or alkyl having 1 to 4 carbon atoms, alkenyl which has 2 to 18 carbon atoms and is unsubstituted or substituted by hydroxyl, phenylalkyl having 1 to 4 carbon atoms in the alkyl moiety, or a radical of the formula —$CH_2CH(OH)$-$T_7$ or

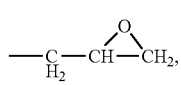

$T_4$ and $T_5$ independently of one another are hydrogen, alkyl having 1 to 18 carbon atoms, alkyl which has 3 to 18 carbon atoms and is interrupted once or several times by —O— or —$NT_6$-, cycloalkyl having 5 to 12 carbon atoms, phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms, $T_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms, phenylalkyl having 1 to 4 carbon atoms in the alkyl moiety, $T_7$ is hydrogen, alkyl having 1 to 18 carbon atoms, phenyl which is unsubstituted or substituted by hydroxyl, phenylalkyl having 1 to 4 carbon atoms in the alkyl moiety, or —$CH_2OT_8$, $T_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl moiety, $T_9$ is alkylene having 2 to 8 carbon atoms, alkenylene having 4 to 8 carbon atoms, alkynylene having 4 carbon atoms, cyclohexylene, alkylene which has 2 to 8 carbon atoms and is interrupted once or several times by —O—, or a radical of the formula —CH$_2$CH(OH) CH$_2$OT$_{11}$OCH$_2$CH(OH)CH$_2$— or —CH$_2$—C (CH$_2$OH)$_2$—CH$_2$—, $T_{10}$ is alkylene which has 2 to 20 carbon atoms and can be interrupted once or several times by —O—, or cyclohexylene, $T_{11}$ is alkylene having 2 to 8 carbon atoms, alkylene which has 2 to 18 carbon atoms and is interrupted once or several times by —O—, 1,3-cyclohexylene, 1,4-cyclohexylene, 1,3-phenylene or 1,4-phenylene, or $T_{10}$ and $T_6$, together with the two nitrogen atoms, are a piperazine ring;

in the compounds of formula (IIc)

$R'_2$ is $C_1$–$C_{12}$alkyl and k is a number from 1 to 4;

in the compounds of the formula (III)

u is 1 or 2 and r is an integer from 1 to 3, the substituents $Y_1$ independently of one another are hydrogen, hydroxyl, phenyl or halogen, halogenomethyl, alkyl having 1 to 12 carbon atoms, alkoxy having 1 to 18 carbon atoms, alkoxy having 1 to 18 carbon atoms which is substituted by a group —COO(C$_1$–C$_{18}$alkyl);

if u is 1, $Y_2$ is alkyl having 1 to 18 carbon atoms, phenyl which is unsubstituted or substituted by hydroxyl, halogen, alkyl or alkoxy having 1 to 18 carbon atoms; alkyl which has 1 to 12 carbon atoms and is substituted by —COOH, —COOY$_8$, —CONH$_2$, —CONHY$_9$, —CONY$_9$Y$_{10}$, —NH$_2$, —NHY$_9$, —NY$_9$Y$_{10}$, —NHCOY$_{11}$, —CN and/or —OCOY$_{11}$;

alkyl which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —OCOY$_{11}$, phenylalkyl which has 1 to 5 carbon atoms in the alkyl moiety and is unsubstituted or substituted by hydroxyl, chlorine and/or methyl, —COY$_{12}$ or —SO$_2$Y$_{13}$, or, if u is 2, $Y_2$ is alkylene having 2 to 16 carbon atoms, alkenylene having 4 to 12 carbon atoms, xylylene, alkylene which has 3 to 20 carbon atoms, is interrupted by one or more —O— atoms and/or is substituted by hydroxyl, —CH$_2$CH(OH)CH$_2$—O—Y$_{15}$—OCH$_2$CH(OH)CH$_2$, —CO—Y$_{16}$—CO—, —CO—NH—Y$_{17}$—NH—CO— or —(CH$_2$)$_m$—CO$_2$—Y$_{18}$—OCO—(CH$_2$)$_m$, in which m is 1, 2 or 3, $Y_8$ is alkyl having 1 to 18 carbon atoms, alkenyl having 3 to 18 carbon atoms, alkyl which has 3 to 20 carbon atoms, is interrupted by one or more oxygen or sulfur atoms or —NT$_6$- and/or is substituted by hydroxyl, alkyl which has 1 to 4 carbon atoms and is substituted by —P(O)(OY$_{14}$)$_2$, —NY$_9$Y$_{10}$ or —OCOY$_{11}$ and/or hydroxyl, alkenyl having 3 to 18 carbon atoms, glycidyl, or phenylalkyl having 1 to 5 carbon atoms in the alkyl moiety, $Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or $Y_9$ and $Y_{10}$ together are alkylene, oxaalkylene or azaalkylene having in each case 3 to 9 carbon atoms, $Y_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, $Y_{13}$ is alkyl having 1 to 18 carbon atoms, phenyl or alkylphenyl having 1 to 8 carbon atoms in the alkyl radical, $Y_{14}$ is alkyl having 1 to 12 carbon atoms or phenyl, $Y_{15}$ is alkylene having 2 to 10 carbon atoms, phenylene or a group -phenylene-M-phenylene- in which M is —O—, —S—, —SO$_2$—, —CH$_2$— or —C(CH$_3$)$_2$—, $Y_{16}$ is alkylene, oxaalkylene or thiaalkylene having in each case 2 to 10 carbon atoms, phenylene or alkenylene having 2 to 6 carbon atoms, $Y_{17}$ is alkylene having 2 to 10 carbon atoms, phenylene or alkylphenylene having 1 to 11 carbon atoms in the alkyl moiety, and $Y_{18}$ is alkylene having 2 to 10 carbon atoms or alkylene which has 4 to 20 carbon atoms and is interrupted once or several times by oxygen; and in the compounds of the formula (IV) x is an integer from 1 to 3 and the substituents L independently of one another are hydrogen, alkyl, alkoxy or alkylthio having in each case 1 to 22 carbon atoms, phenoxy or phenylthio.

4. A polymer composition according to claim 1 wherein the total amount of UV-absorber is from 0.005 to 5% based on the weight of the polymer.

5. A polymer composition according to claim 1 wherein the sterically hindered amine is selected from the group consisting of bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)

pyrrolidin-2,5-dione, 3-dodecyl-1-(1,2,2,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl- 4-aminopiperidine or 1,2,2,6,6-pentamethyl-4-aminopiperidine and a compound

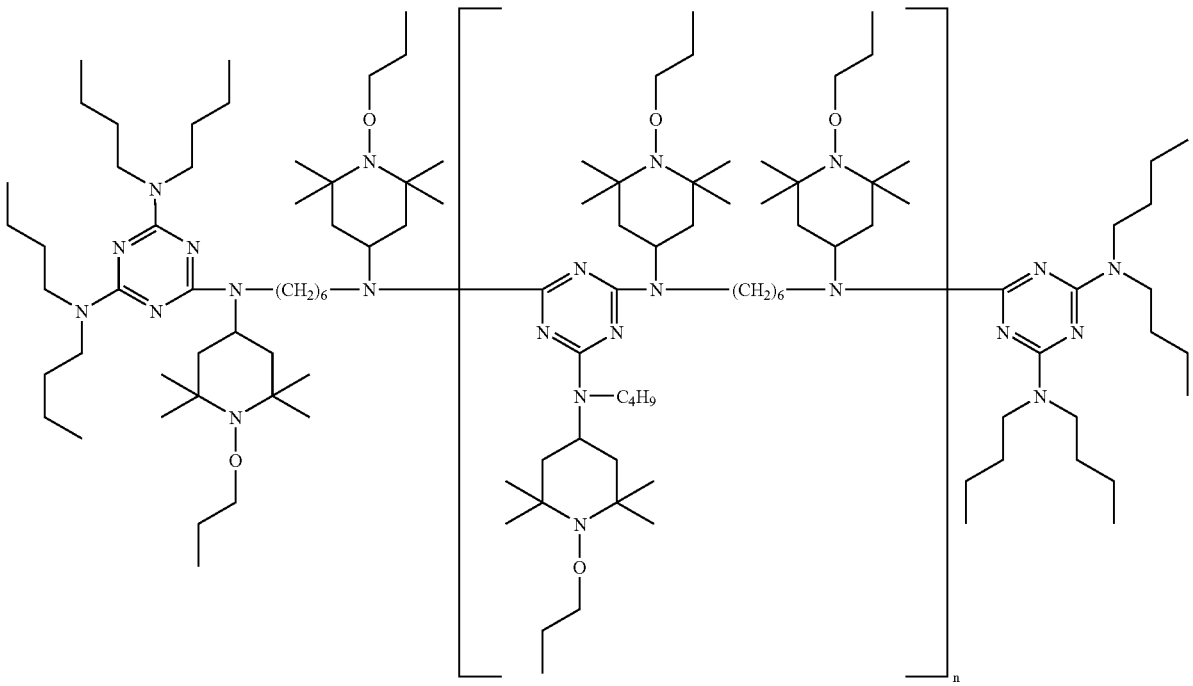

in which n is from 1 to 15.

6. A polymer composition according to claim 1 wherein the sterically hindered amine compound is present in an amount of from 0.005 to 5% by weight, based on the weight of the polymer.

7. A polymer composition according to claim 1 wherein the condensation product is of formula (I) and/or (II)

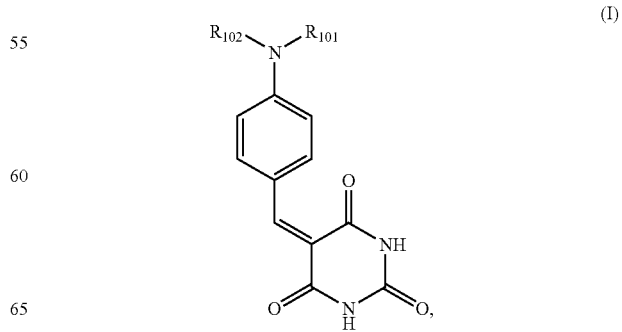

-continued

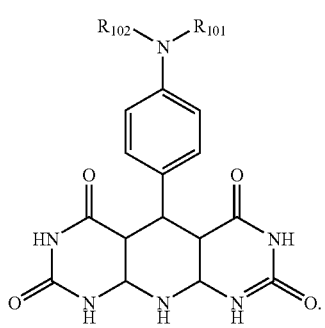
(II)

8. A polymer composition according to claim 1 wherein $R_{101}$ and $R_{102}$ are methyl.

9. A polymer composition according to claim 1 wherein the condensation product is present in an amount of from 0.005% to 10% by weight based on the weight of the thermoplastic polymer.

10. A polymer composition according to claim 1 wherein the thermoplastic polymer is selected from the group consisting of a polyolefin, a polyester, a polyvinylalcohol, a polyvinylacetate and a polycarbonate.

11. A polymer composition according to claim 1, which is in the form of a film with a thickness from 10µ to 300µ.

12. A polymer composition according to claim 11 wherein the film is a multilayer construction of between 2 and 7 polymer layers containing the condensation product, component b) and the components c1), c2) or c3) according to in at least 1 layer.

13. A polymer composition according to claim 1 containing an additional additive selected from the group consisting of a phenolic antioxidant, a phosphite or phosphonite, a further fluorescent dye or pigment, a processing aid, a filler or reinforcing material and an antifog additive.

14. A process for enhancing plant growth, comprising exposing a plant to actinic radiation behind or under a thermoplastic polymer composition according to claim 1.

* * * * *